(12) United States Patent
Huntress et al.

(10) Patent No.: US 10,265,900 B2
(45) Date of Patent: Apr. 23, 2019

(54) SYSTEMS AND METHODS FOR MANUFACTURING REINFORCED WEATHERSTRIP

(71) Applicant: Amesbury Group, Inc., Amesbury, MA (US)

(72) Inventors: John E. Huntress, Brentwood, NH (US); Peter Mertinooke, Amesbury, MA (US)

(73) Assignee: Amesbury Group, Inc., Amesbury, MA (US)

( * ) Notice: Subject to any disclaimer, the term of this patent is extended or adjusted under 35 U.S.C. 154(b) by 186 days.

(21) Appl. No.: 15/145,963

(22) Filed: May 4, 2016

(65) Prior Publication Data

US 2016/0318226 A1    Nov. 3, 2016

Related U.S. Application Data

(60) Division of application No. 12/690,405, filed on Jan. 20, 2010, now Pat. No. 9,358,716, which is a
(Continued)

(51) Int. Cl.
*B29K 7/00* (2006.01)
*E06B 7/23* (2006.01)
(Continued)

(52) U.S. Cl.
CPC .............. *B29C 47/02* (2013.01); *B29C 31/04* (2013.01); *B29C 35/02* (2013.01); *B29C 44/326* (2013.01);
(Continued)

(58) Field of Classification Search
CPC .......... B29C 47/02; B29C 31/04; B29C 35/02
See application file for complete search history.

(56) References Cited

U.S. PATENT DOCUMENTS

| 343,345 A | 6/1886 | Sparks |
| 874,938 A | 12/1907 | Cazin |

(Continued)

FOREIGN PATENT DOCUMENTS

| CA | 852096 | 9/1970 |
| CA | 1177212 | 11/1984 |

(Continued)

OTHER PUBLICATIONS

PCT International Search Report and Written Opinion in International Application PCT/US2016/017801, dated May 2, 2016, 14 pages.

(Continued)

*Primary Examiner* — Victor S Chang

(57) ABSTRACT

Methods for manufacturing fabric-reinforced weatherstrip include incorporating a fabric application step into a process for making coated substrates. In one embodiment, a strip of the fabric from a roll of material may be applied directly onto a coating after it has been applied in a coat die to a foam profile, while the coating is still in the molten state. Alternatively, a fabric application plate may be attached to an upstream side of coating die with a fabric feed channel cut into the plate. The fabric follows the channel to contact and mate with the foam profile. The fabric applicator plate may be configured so as to exert pressure on only the part of the product where the fabric is being applied. Ultrasonic welding techniques may also be employed.

16 Claims, 27 Drawing Sheets

Related U.S. Application Data continuation of application No. 11/716,397, filed on Mar. 9, 2007, now Pat. No. 7,718,251.

(60) Provisional application No. 60/780,991, filed on Mar. 10, 2006.

(51) Int. Cl.

| | |
|---|---|
| *B29C 31/04* | (2006.01) |
| *B29C 31/08* | (2006.01) |
| *B29C 35/02* | (2006.01) |
| *B29C 44/32* | (2006.01) |
| *B29C 47/00* | (2006.01) |
| *B29C 47/02* | (2006.01) |
| *B29C 47/04* | (2006.01) |
| *B29C 47/06* | (2006.01) |
| *B29C 47/12* | (2006.01) |
| *B29C 47/34* | (2006.01) |
| *B29C 47/52* | (2006.01) |
| *B29C 63/04* | (2006.01) |
| *B29C 65/00* | (2006.01) |
| *B29C 65/02* | (2006.01) |
| *B29C 65/08* | (2006.01) |
| *B29C 65/56* | (2006.01) |
| *B29C 65/62* | (2006.01) |
| *B29K 19/00* | (2006.01) |
| *B29K 23/00* | (2006.01) |
| *B29K 55/02* | (2006.01) |
| *B29K 105/04* | (2006.01) |
| *B29L 31/00* | (2006.01) |
| *B29L 31/26* | (2006.01) |
| *B29K 101/12* | (2006.01) |
| *B29K 33/00* | (2006.01) |
| *B29K 75/00* | (2006.01) |
| *B29K 77/00* | (2006.01) |
| *B29K 83/00* | (2006.01) |

(52) U.S. Cl.
CPC .......... *B29C 47/025* (2013.01); *B29C 47/026* (2013.01); *B29C 47/128* (2013.01); *B29C 65/08* (2013.01); *B29C 65/562* (2013.01); *E06B 7/2305* (2013.01); *E06B 7/2314* (2013.01); *B29C 31/08* (2013.01); *B29C 47/003* (2013.01); *B29C 47/0023* (2013.01); *B29C 47/021* (2013.01); *B29C 47/04* (2013.01); *B29C 47/065* (2013.01); *B29C 47/34* (2013.01); *B29C 47/52* (2013.01); *B29C 63/044* (2013.01); *B29C 65/02* (2013.01); *B29C 65/086* (2013.01); *B29C 65/56* (2013.01); *B29C 65/62* (2013.01); *B29C 66/0242* (2013.01); *B29C 66/433* (2013.01); *B29C 66/524* (2013.01); *B29C 66/5326* (2013.01); *B29C 66/71* (2013.01); *B29C 66/727* (2013.01); *B29C 66/7292* (2013.01); *B29C 66/72941* (2013.01); *B29C 66/73771* (2013.01); *B29C 66/73921* (2013.01); *B29C 66/81463* (2013.01); *B29C 66/83411* (2013.01); *B29C 66/83413* (2013.01); *B29C 66/8432* (2013.01); *B29K 2023/06* (2013.01); *B29K 2023/083* (2013.01); *B29K 2023/12* (2013.01); *B29K 2033/08* (2013.01); *B29K 2055/02* (2013.01); *B29K 2075/00* (2013.01); *B29K 2077/00* (2013.01); *B29K 2083/00* (2013.01); *B29K 2101/12* (2013.01); *B29K 2105/04* (2013.01); *B29L 2031/003* (2013.01); *B29L 2031/006* (2013.01); *B29L 2031/26* (2013.01); *Y10T 428/249953* (2015.04)

(56) References Cited

U.S. PATENT DOCUMENTS

| | | |
|---|---|---|
| 1,312,034 A | 8/1919 | Jones |
| 1,776,073 A | 9/1930 | Girard |
| 1,805,145 A | 5/1931 | Koops |
| 1,826,297 A | 10/1931 | Apple |
| 1,943,818 A | 1/1934 | Fantone |
| 1,960,137 A | 5/1934 | Brown |
| 1,960,997 A | 5/1934 | Halloran |
| 2,012,625 A | 8/1935 | Calcutt |
| 2,115,368 A | 4/1938 | Lustberg |
| 2,127,413 A | 8/1938 | Leguillon |
| 2,138,699 A | 11/1938 | Hinze |
| 2,175,099 A | 10/1939 | Abbott |
| 2,199,067 A | 4/1940 | Bradt |
| 2,200,933 A | 5/1940 | Nystrom |
| 2,218,482 A | 10/1940 | Reevely |
| 2,280,415 A | 4/1942 | Larmuth |
| 2,293,252 A | 8/1942 | Foster |
| 2,314,168 A | 3/1943 | Smith |
| 2,341,450 A | 2/1944 | Knaus |
| 2,354,426 A | 7/1944 | Briant |
| 2,366,077 A | 12/1944 | Wildy et al. |
| 2,386,995 A | 10/1945 | Wigal |
| 2,390,780 A | 12/1945 | Cornwell |
| 2,415,721 A | 2/1947 | Arner |
| 2,459,120 A | 1/1949 | Sparagen |
| 2,550,520 A | 4/1951 | Bennett |
| 2,555,380 A | 6/1951 | Stuart et al. |
| 2,602,959 A | 7/1952 | Fenlin |
| 2,623,444 A | 12/1952 | Maier et al. |
| 2,626,426 A | 1/1953 | Stahl |
| 2,657,414 A | 11/1953 | Miller et al. |
| 2,677,633 A | 5/1954 | Gross |
| 2,695,421 A | 11/1954 | Amundson et al. |
| 2,724,877 A | 11/1955 | Ramsay |
| 2,726,632 A | 12/1955 | Asbeck et al. |
| 2,748,044 A | 5/1956 | Seiler |
| 2,754,543 A | 7/1956 | Loew |
| 2,757,709 A | 8/1956 | Crabbe et al. |
| 2,761,417 A | 9/1956 | Russell et al. |
| 2,761,418 A | 9/1956 | Russell |
| 2,761,791 A | 9/1956 | Russell |
| 2,778,059 A | 1/1957 | Henning et al. |
| 2,786,622 A | 3/1957 | Ross et al. |
| 2,797,443 A | 7/1957 | Carlson |
| 2,821,497 A | 1/1958 | Works et al. |
| 2,838,813 A | 6/1958 | Naramore |
| 2,839,796 A | 6/1958 | Quoss |
| 2,868,159 A | 1/1959 | Lit et al. |
| 2,874,752 A | 2/1959 | Brey |
| 2,880,698 A | 4/1959 | Olson |
| 2,911,382 A | 11/1959 | Barkhnff et al. |
| 2,933,782 A | 4/1960 | Cornell |
| 2,933,784 A | 4/1960 | Hooverson |
| 2,952,240 A | 9/1960 | Abbott |
| 2,977,632 A | 4/1961 | Bunch |
| 3,029,779 A | 4/1962 | Hornbostel |
| 3,032,008 A | 5/1962 | Land et al. |
| 3,032,812 A | 5/1962 | Van Riper |
| 3,041,681 A | 7/1962 | Goodwin |
| 3,041,682 A | 7/1962 | Alderfer et al. |
| 3,075,653 A | 1/1963 | Wales et al. |
| 3,081,213 A | 3/1963 | Chinn |
| 3,155,540 A | 11/1964 | Loeffler et al. |
| 3,155,543 A | 11/1964 | Marzocchi et al. |
| 3,167,827 A | 2/1965 | Alley et al. |
| 3,184,808 A | 5/1965 | Lyon |
| 3,184,811 A | 5/1965 | Bennett et al. |
| 3,206,323 A | 9/1965 | Miller et al. |
| 3,227,577 A | 1/1966 | Baessler et al. |
| 3,238,573 A | 3/1966 | Pease, Jr. |
| 3,251,911 A | 5/1966 | Hansen |
| 3,287,477 A | 11/1966 | Vesilind |
| 3,309,439 A | 3/1967 | Nonweiler |
| 3,350,248 A | 10/1967 | Demarest, Jr. et al. |
| 3,378,956 A | 4/1968 | Parks et al. |

(56) References Cited

U.S. PATENT DOCUMENTS

| | | |
|---|---|---|
| 3,385,001 A | 5/1968 | Bordner |
| 3,407,253 A | 10/1968 | Yoshimura et al. |
| 3,412,709 A | 11/1968 | Goyffon |
| 3,420,208 A | 1/1969 | Guthrie |
| 3,424,130 A | 1/1969 | Byrnes et al. |
| 3,448,543 A | 6/1969 | Multer |
| 3,450,098 A | 6/1969 | Williams |
| 3,469,349 A | 9/1969 | Multer |
| 3,471,898 A | 10/1969 | Krystof |
| 3,473,512 A | 10/1969 | Wood |
| 3,482,006 A | 12/1969 | Carlson |
| 3,531,829 A | 10/1970 | Skobel et al. |
| 3,535,824 A | 10/1970 | Kessler |
| 3,564,773 A | 2/1971 | Bonnaud |
| 3,595,204 A | 7/1971 | McIntyre |
| 3,596,432 A | 8/1971 | Straub et al. |
| 3,624,964 A | 12/1971 | Bordner et al. |
| 3,635,620 A | 1/1972 | Brown |
| 3,669,062 A | 6/1972 | Kallianides et al. |
| 3,672,974 A | 6/1972 | Tomlinson |
| 3,685,206 A | 8/1972 | Kessler |
| 3,700,368 A | 10/1972 | Wells |
| 3,700,486 A | 10/1972 | Veltri et al. |
| 3,733,660 A | 5/1973 | Kallianides et al. |
| 3,737,490 A | 6/1973 | Nicholson |
| 3,755,873 A | 9/1973 | Lansing |
| 3,762,100 A | 10/1973 | Kempel |
| 3,767,454 A | 10/1973 | Franke, Jr. et al. |
| 3,781,390 A | 12/1973 | Wells |
| 3,782,870 A | 1/1974 | Schippers |
| 3,789,099 A | 1/1974 | Garrett et al. |
| 3,811,989 A | 5/1974 | Hearn |
| 3,813,199 A | 5/1974 | Friesner |
| 3,814,779 A | 6/1974 | Wiley |
| 3,815,637 A | 6/1974 | Carrow |
| 3,827,841 A | 8/1974 | Kawai et al. |
| 3,836,297 A | 9/1974 | Weaver |
| 3,840,384 A | 10/1974 | Reade et al. |
| 3,841,807 A | 10/1974 | Weaver |
| 3,842,564 A | 10/1974 | Brown |
| 3,843,475 A | 10/1974 | Kent |
| 3,869,325 A | 3/1975 | Witzig |
| 3,874,329 A | 4/1975 | McLarty |
| 3,876,487 A | 4/1975 | Garrett et al. |
| 3,882,817 A | 5/1975 | Zink |
| 3,882,819 A | 5/1975 | Skeeters |
| 3,886,898 A | 6/1975 | Colegrove et al. |
| 3,888,713 A | 6/1975 | Alderfer |
| 3,903,233 A | 9/1975 | Dougherty |
| 3,907,536 A | 9/1975 | Achener |
| 3,918,206 A | 11/1975 | Dochnahl |
| 3,928,521 A | 12/1975 | Haren et al. |
| 3,937,644 A | 2/1976 | Bergeron et al. |
| 3,940,467 A | 2/1976 | Brachman |
| 3,941,543 A | 3/1976 | Buonanno |
| 3,944,459 A | 3/1976 | Skobel |
| 3,952,552 A | 4/1976 | Rozner |
| 3,956,438 A | 5/1976 | Schippers |
| 3,965,931 A | 6/1976 | Skobel |
| 3,981,830 A | 9/1976 | Takeuchi et al. |
| 3,999,509 A | 12/1976 | Lucas |
| 4,020,194 A | 4/1977 | McIntyre et al. |
| 4,049,760 A | 9/1977 | Lozach |
| 4,073,408 A | 2/1978 | Hartwig |
| 4,075,851 A | 2/1978 | Gardner |
| 4,077,443 A | 3/1978 | Coller et al. |
| 4,087,223 A | 5/1978 | Angioletti et al. |
| 4,096,973 A | 6/1978 | Checko |
| 4,104,207 A | 8/1978 | Pelikan et al. |
| 4,106,437 A | 8/1978 | Bartlett |
| 4,107,260 A | 8/1978 | Dougherty |
| 4,116,159 A | 9/1978 | Long |
| 4,117,196 A | 9/1978 | Mathias |
| 4,118,166 A | 10/1978 | Bartrum |
| 4,119,325 A | 10/1978 | Oakley et al. |
| 4,123,100 A | 10/1978 | Ellis |
| 4,124,336 A | 11/1978 | Johnson |
| 4,130,535 A | 12/1978 | Coran et al. |
| 4,144,838 A | 3/1979 | Ichiyanagi et al. |
| 4,156,044 A | 5/1979 | Mracek et al. |
| 4,157,149 A | 6/1979 | Moen |
| 4,181,647 A | 1/1980 | Beach |
| 4,181,780 A | 1/1980 | Brenner et al. |
| 4,185,416 A | 1/1980 | Wilmes |
| 4,187,068 A | 2/1980 | Vassar |
| 4,189,520 A | 2/1980 | Gauchel |
| 4,200,207 A | 4/1980 | Akers et al. |
| 4,204,496 A | 5/1980 | Ikegami et al. |
| 4,204,821 A | 5/1980 | Gauchel et al. |
| 4,206,011 A | 6/1980 | Kanotz et al. |
| 4,208,200 A | 6/1980 | Claypoole et al. |
| 4,212,787 A | 7/1980 | Matsuda et al. |
| 4,222,729 A | 9/1980 | Ragazzini et al. |
| 4,226,662 A | 10/1980 | McCort |
| 4,238,260 A | 12/1980 | Washkewicz |
| 4,246,299 A | 1/1981 | Ohls |
| 4,258,646 A | 3/1981 | Kloczewski et al. |
| 4,259,379 A | 3/1981 | Britton et al. |
| 4,263,348 A | 4/1981 | Renegar |
| 4,274,596 A | 6/1981 | Howes |
| 4,274,821 A | 6/1981 | Kiemer |
| 4,277,301 A | 7/1981 | McIntyre et al. |
| 4,287,684 A | 9/1981 | McKann |
| 4,288,482 A | 9/1981 | Beck |
| 4,290,249 A | 9/1981 | Mass |
| 4,296,062 A | 10/1981 | Gauchel et al. |
| 4,299,186 A | 11/1981 | Pipkin et al. |
| 4,299,187 A | 11/1981 | Renegar |
| 4,305,900 A | 12/1981 | Cavalli |
| 4,305,984 A | 12/1981 | Boyce |
| 4,308,352 A | 12/1981 | Knaus |
| 4,309,160 A | 1/1982 | Poutanen et al. |
| 4,311,628 A | 1/1982 | Abdou-Sabet et al. |
| 4,312,950 A | 1/1982 | Snyder et al. |
| 4,312,958 A | 1/1982 | DiGiulio et al. |
| 4,313,645 A | 2/1982 | Cocco |
| 4,314,834 A | 2/1982 | Feenstra et al. |
| 4,321,072 A | 3/1982 | Dubos et al. |
| 4,323,655 A | 4/1982 | DiGiulio et al. |
| 4,328,273 A | 5/1982 | Yackiw |
| 4,341,509 A | 7/1982 | Harlow |
| 4,343,845 A | 8/1982 | Burden et al. |
| 4,344,710 A | 8/1982 | Johnson et al. |
| 4,347,806 A | 9/1982 | Argazzi et al. |
| 4,352,892 A | 10/1982 | Lohmar |
| 4,354,989 A | 10/1982 | Beach |
| 4,356,216 A | 10/1982 | Gailey et al. |
| 4,358,497 A | 11/1982 | Miska |
| 4,360,395 A | 11/1982 | Suzuki |
| 4,368,224 A | 1/1983 | Jackson |
| 4,370,355 A | 1/1983 | Niesse |
| 4,387,123 A | 6/1983 | Wollam et al. |
| 4,401,612 A | 8/1983 | Nehney et al. |
| 4,401,783 A | 8/1983 | Kotian |
| 4,409,165 A | 10/1983 | Kim |
| 4,409,365 A | 10/1983 | Coran et al. |
| 4,411,941 A | 10/1983 | Azzola |
| 4,419,309 A | 12/1983 | Krutchen |
| 4,419,958 A | 12/1983 | Roba |
| 4,421,867 A | 12/1983 | Nojiri et al. |
| 4,438,223 A | 3/1984 | Hunter |
| 4,442,788 A | 4/1984 | Weis |
| 4,446,179 A | 5/1984 | Waugh |
| 4,454,687 A | 6/1984 | Baker |
| 4,458,376 A | 7/1984 | Sitko |
| 4,458,450 A | 7/1984 | Young et al. |
| 4,470,941 A | 9/1984 | Kurtz |
| 4,474,830 A | 10/1984 | Taylor |
| 4,476,165 A | 10/1984 | McIntyre |
| 4,477,298 A | 10/1984 | Bohannon, Jr. et al. |
| 4,510,031 A | 4/1985 | Matsuura et al. |
| 4,510,884 A | 4/1985 | Rosebrooks |
| 4,512,945 A | 4/1985 | Vigano |
| 4,517,316 A | 5/1985 | Mason |

(56) References Cited

U.S. PATENT DOCUMENTS

| | | |
|---|---|---|
| 4,526,736 A | 7/1985 | Searl et al. |
| 4,527,825 A | 7/1985 | Clouse |
| 4,530,851 A | 7/1985 | Shannon et al. |
| 4,532,260 A | 7/1985 | MacKeighen et al. |
| 4,535,564 A | 8/1985 | Yackiw |
| 4,537,825 A | 8/1985 | Yardley |
| 4,538,380 A | 9/1985 | Colliander |
| 4,557,217 A | 12/1985 | Zingg |
| 4,559,095 A | 12/1985 | Babbin |
| 4,562,023 A | 12/1985 | Pabst et al. |
| 4,563,141 A | 1/1986 | Zoller |
| 4,568,507 A | 2/1986 | Baxter |
| 4,569,704 A | 2/1986 | Bohannon, Jr. et al. |
| 4,581,383 A | 4/1986 | Park |
| 4,583,485 A | 4/1986 | Smith, Jr. |
| 4,585,035 A | 4/1986 | Piccoli |
| 4,587,133 A | 5/1986 | Shannon et al. |
| 4,589,367 A | 5/1986 | Renegar et al. |
| 4,593,062 A | 6/1986 | Puydak et al. |
| 4,600,728 A | 7/1986 | MacKeighen et al. |
| 4,601,918 A | 7/1986 | Zaman et al. |
| 4,604,300 A | 8/1986 | Keys et al. |
| 4,613,521 A | 9/1986 | Smith, Jr. |
| 4,616,052 A | 10/1986 | Habibullah |
| 4,622,092 A | 11/1986 | Bohannon, Jr. et al. |
| 4,623,501 A | 11/1986 | Ishizaki |
| 4,628,639 A | 12/1986 | Lownsdale |
| 4,644,898 A | 2/1987 | Jochem et al. |
| 4,649,856 A | 3/1987 | Shannon et al. |
| 4,651,672 A | 3/1987 | Sommer |
| 4,652,475 A | 3/1987 | Haney et al. |
| 4,654,262 A | 3/1987 | Alonso |
| 4,656,785 A | 4/1987 | Yackiw |
| 4,658,548 A | 4/1987 | Gerritsen |
| 4,659,746 A | 4/1987 | Topcik |
| 4,660,147 A | 4/1987 | Allen, Jr. et al. |
| 4,668,319 A | 5/1987 | Piccoli |
| 4,680,317 A | 7/1987 | Kuhnel et al. |
| 4,683,166 A | 7/1987 | Yuto et al. |
| 4,687,137 A | 8/1987 | Boger et al. |
| 4,688,515 A | 8/1987 | Rosebrooks |
| 4,694,627 A | 9/1987 | Omholt |
| 4,695,236 A | 9/1987 | Predohl et al. |
| 4,707,172 A | 11/1987 | Sottini et al. |
| 4,708,351 A | 11/1987 | Midooka et al. |
| 4,719,039 A | 1/1988 | Leonardi |
| 4,720,936 A | 1/1988 | Ellingson |
| 4,721,591 A | 1/1988 | Cheng-Shiang |
| 4,722,818 A | 2/1988 | Zoller |
| 4,725,468 A | 2/1988 | McIntyre |
| 4,729,807 A | 3/1988 | Hede et al. |
| 4,730,416 A | 3/1988 | Eames |
| 4,735,169 A | 4/1988 | Cawston et al. |
| 4,738,810 A | 4/1988 | Cheng-Shiang |
| 4,742,646 A | 5/1988 | Kehrli |
| 4,746,477 A | 5/1988 | Wecker et al. |
| 4,746,545 A | 5/1988 | McIntyre |
| 4,756,271 A | 7/1988 | Maier |
| 4,767,183 A | 8/1988 | Martin |
| 4,774,109 A | 9/1988 | Hadzimihalis et al. |
| 4,778,367 A | 10/1988 | Hilakos |
| 4,805,554 A | 2/1989 | McIntyre |
| 4,807,397 A | 2/1989 | Doan |
| 4,844,004 A | 7/1989 | Hadzimihalis et al. |
| 4,856,975 A | 8/1989 | Gearhart |
| 4,857,668 A * | 8/1989 | Buonanno ............ H05K 9/0015 174/354 |
| 4,865,676 A | 9/1989 | Kimura et al. |
| 4,880,674 A | 11/1989 | Shimizu |
| 4,883,690 A | 11/1989 | Carter |
| 4,883,691 A | 11/1989 | McIntyre |
| 4,889,669 A | 12/1989 | Suzuki |
| 4,891,249 A | 1/1990 | McIntyre |
| 4,894,105 A | 1/1990 | Dyksterhouse et al. |
| 4,898,760 A | 2/1990 | Halberstadt et al. |
| 4,900,490 A | 2/1990 | Kozma |
| 4,907,741 A | 3/1990 | McIntyre |
| 4,916,863 A | 4/1990 | Burrous et al. |
| 4,918,111 A | 4/1990 | Tanaka et al. |
| 4,919,739 A | 4/1990 | Dyksterhouse et al. |
| 4,930,257 A | 6/1990 | Windgassen |
| 4,940,557 A | 7/1990 | Kimura |
| 4,943,472 A | 7/1990 | Dyksterhouse et al. |
| 4,968,854 A | 11/1990 | Benn, Sr. et al. |
| 4,984,533 A | 1/1991 | Takahashi et al. |
| 5,000,988 A | 3/1991 | Inoue et al. |
| 5,001,865 A | 3/1991 | Procton |
| 5,007,203 A | 4/1991 | Katrynuik |
| 5,009,947 A | 4/1991 | McManus et al. |
| 5,070,111 A | 12/1991 | Dumbauld |
| 5,075,139 A | 12/1991 | Crumbach et al. |
| 5,087,488 A | 2/1992 | Cakmakci |
| 5,093,181 A | 3/1992 | Sanchez |
| 5,094,792 A | 3/1992 | Baran |
| 5,128,198 A | 7/1992 | Dyksterhouse et al. |
| 5,143,772 A | 9/1992 | Iwasa |
| 5,156,715 A | 10/1992 | Starnes, Jr. |
| 5,160,541 A | 11/1992 | Fickling et al. |
| 5,169,449 A | 12/1992 | Raught |
| 5,186,279 A | 2/1993 | Chasteen et al. |
| 5,192,586 A | 3/1993 | Mertinooke et al. |
| 5,205,890 A | 4/1993 | Darsey et al. |
| 5,221,346 A | 6/1993 | Anderson |
| 5,237,383 A | 8/1993 | Parisi |
| 5,237,917 A | 8/1993 | Traut et al. |
| 5,251,809 A | 10/1993 | Drummond et al. |
| 5,266,019 A | 11/1993 | Farber |
| 5,271,794 A | 12/1993 | Jarrell et al. |
| 5,326,592 A | 7/1994 | Goewey et al. |
| 5,354,378 A | 10/1994 | Hauser et al. |
| 5,368,644 A | 11/1994 | Delgado |
| 5,382,401 A | 1/1995 | Pickett et al. |
| 593,796 A | 2/1995 | Halberstadt et al. |
| 5,393,796 A | 2/1995 | Halberstadt et al. |
| 5,409,733 A | 4/1995 | Boger et al. |
| 5,411,785 A | 5/1995 | Cook |
| 5,415,822 A | 5/1995 | Cook |
| 5,418,009 A | 5/1995 | Raterman et al. |
| 5,421,921 A | 6/1995 | Gill et al. |
| 5,423,935 A | 6/1995 | Benecke et al. |
| 5,426,894 A | 6/1995 | Headrick |
| 5,429,840 A | 7/1995 | Raterman et al. |
| 5,438,802 A | 8/1995 | Johnson |
| 5,442,825 A * | 8/1995 | Hahn ................... B65G 69/008 14/71.1 |
| 5,449,408 A | 9/1995 | Koaizawa et al. |
| 5,451,355 A | 9/1995 | Boissonnat et al. |
| 5,458,291 A | 10/1995 | Brusko et al. |
| 5,474,841 A | 12/1995 | Matsuki et al. |
| 5,512,601 A | 4/1996 | Halberstadt et al. |
| 5,516,545 A | 5/1996 | Sandock |
| 5,524,828 A | 6/1996 | Raterman et al. |
| 5,525,668 A | 6/1996 | Olivier |
| 5,533,675 A | 7/1996 | Benecke et al. |
| 5,538,380 A | 7/1996 | Norton et al. |
| 5,538,754 A | 7/1996 | Sandock |
| 5,571,326 A | 11/1996 | Boissonnat et al. |
| 5,573,638 A | 11/1996 | Lennon et al. |
| 5,574,118 A | 11/1996 | Olivier |
| 5,586,963 A | 12/1996 | Lennon et al. |
| 5,588,997 A | 12/1996 | Lysson et al. |
| 5,601,646 A | 2/1997 | Gardner et al. |
| 5,607,629 A | 3/1997 | DeMello et al. |
| 5,636,790 A | 6/1997 | Brusko et al. |
| 5,654,346 A | 8/1997 | Halberstadt et al. |
| 5,656,086 A | 8/1997 | Hultzsch et al. |
| 5,665,164 A | 9/1997 | Milliman |
| 5,683,036 A | 11/1997 | Benecke et al. |
| 5,685,911 A | 11/1997 | Raterman et al. |
| 5,686,165 A | 11/1997 | Cook |
| 5,700,845 A | 12/1997 | Chung et al. |
| 5,728,406 A | 3/1998 | Halberstadt et al. |
| 5,728,430 A | 3/1998 | Sartor et al. |
| 5,728,911 A | 3/1998 | Hall |

(56) References Cited

U.S. PATENT DOCUMENTS

| | | |
|---|---|---|
| 5,733,608 A | 3/1998 | Kessel et al. |
| 5,788,889 A | 8/1998 | DeMello et al. |
| 5,795,516 A | 8/1998 | Cho et al. |
| 5,801,209 A | 9/1998 | Chung et al. |
| 5,802,948 A | 9/1998 | Andrisin, III et al. |
| 5,804,284 A | 9/1998 | Lennon et al. |
| 5,824,400 A | 10/1998 | Petrakis et al. |
| 5,843,230 A | 12/1998 | Potjer et al. |
| 5,843,231 A | 12/1998 | Spencer et al. |
| 5,851,566 A | 12/1998 | Potjer et al. |
| 5,875,555 A | 3/1999 | Andrisin, III et al. |
| 5,887,392 A | 3/1999 | Martin |
| 5,903,004 A | 5/1999 | Koshihara et al. |
| 5,907,004 A | 5/1999 | Dozeman et al. |
| 5,943,825 A | 8/1999 | Procton et al. |
| 5,948,858 A | 9/1999 | Dorrestijn et al. |
| 5,962,075 A | 10/1999 | Sartor et al. |
| 5,968,854 A | 10/1999 | Akopian et al. |
| 5,995,693 A | 11/1999 | Yang et al. |
| 6,132,809 A | 10/2000 | Hynes et al. |
| 6,227,634 B1 | 5/2001 | Cittadini |
| 6,514,604 B2 | 2/2003 | Gopalan et al. |
| 6,623,014 B1 | 9/2003 | Matrin |
| 6,677,020 B2 | 1/2004 | Dron |
| 6,776,948 B1 | 8/2004 | Arvidson et al. |
| 6,883,847 B2 | 4/2005 | Willett |
| 6,968,649 B2 | 11/2005 | Van Den Oord |
| 7,017,305 B2 | 3/2006 | Ikuta |
| 7,281,354 B2 | 10/2007 | Nishihara |
| D571,932 S | 6/2008 | Can Camp |
| 7,419,555 B2 | 9/2008 | Kaplo et al. |
| 7,718,251 B2 | 5/2010 | Huntress et al. |
| 8,225,554 B2 | 7/2012 | Nazaki |
| 8,510,996 B2 | 8/2013 | Foster |
| 9,358,716 B2 | 6/2016 | Huntress et al. |
| 2004/0074719 A1 | 4/2004 | Loughney |
| 2004/0123532 A1 | 7/2004 | Thill et al. |
| 2005/0102929 A1 | 5/2005 | Hoffmann et al. |
| 2005/0186396 A1 | 8/2005 | Okajima et al. |
| 2007/0113482 A1 | 5/2007 | Dumke |
| 2007/0218270 A1 | 9/2007 | Huntress et al. |
| 2009/0313900 A1 | 12/2009 | Foster |
| 2010/0136317 A1 | 6/2010 | Huntress |
| 2014/0199512 A1 | 7/2014 | Abramson |
| 2015/0240556 A1 | 8/2015 | Allingson |
| 2016/0237737 A1 | 8/2016 | Mertinooke |
| 2016/0237738 A1 | 8/2016 | Mertinooke |
| 2018/0154567 A1 | 6/2018 | Huntress |

FOREIGN PATENT DOCUMENTS

| | | |
|---|---|---|
| DE | 3503200 | 5/1986 |
| DE | 202004007829 | 8/2004 |
| DE | 102008046753 | 3/2010 |
| EP | 260674 | 3/1988 |
| EP | 996552 | 1/1999 |
| EP | 1222085 | 4/2001 |
| EP | 1227947 | 5/2001 |
| FR | 1590375 | 5/1970 |
| FR | 2200109 | 4/1974 |
| FR | 2310207 | 12/1980 |
| FR | 2572678 | 5/1986 |
| GB | 1160043 | 7/1969 |
| GB | 1305808 | 2/1973 |
| GB | 1409441 | 10/1975 |
| GB | 1467534 | 3/1977 |
| GB | 1507071 | 4/1978 |
| GB | 1545511 | 5/1979 |
| GB | 2067104 | 7/1981 |
| GB | 1595214 | 8/1981 |
| GB | 2132509 | 7/1984 |
| GB | 2136484 | 9/1984 |
| GB | 2146940 | 5/1985 |
| GB | 2146941 | 5/1985 |
| GB | 2179270 | 3/1987 |
| GB | 2226965 | 7/1990 |
| GB | 2355480 | 4/2001 |
| JP | 55-101438 | 8/1980 |
| JP | 58-168544 | 10/1983 |
| JP | S59-54535 | 3/1984 |
| JP | 1101267 | 4/1989 |
| WO | 98/58528 | 12/1998 |
| WO | 2005028231 | 3/2005 |

OTHER PUBLICATIONS

Amesbury Sealing Products, Foam-Tite Selection Guide, 2013, 1 page.
Amesbury Sealing Products, Foam-Tite Foam Seals Part# 12083, copyright 2013, located online at: http://www_amesbury.com/divisions/sealing-products/parts/4/160 on Jul. 19, 2017, 1 page.
Schlegel, Q-LON QEBD 650 Door Seal, Jun. 2008, 2 pages.
Schlegel, Profile Selection Guide Building Products Division, Jun. 2008, 2 pages.
PCT International Search Report and Written Opinion in International Application PCT/US2016/017843, dated May 19, 2016, 12 pgs.
"Foam Extrusion Technology for TP Elastomer" Plastic Technology, Feb. 1987, pp. 23 and 25.
"Ultrafab's Extruded Components is Growing with Customer Demand," ISC Today, vol. 3, No. 3, 2 pgs., (no date).
Amesbury Group Inc., "Custom Molding on Demand", 17 pgs., (no date).
Amesbury Industries, "High-Performance Weatherseals for Window & Doors", 19 pgs., (no date).
Begin, Sherri, "AES Process Coextrudes EPDM, TPV", Rubber and Plastics News, 1 pg., (no date).
Benning, C.J., "Plastic Foams: The Physics and Chemistry of Product Performance and Process Technology", vol. II: Structure Properties and Applications, 3 pages (1969).
Boehringer Ingelheim, Hydrocerol Chemical Foaming and Nucleating Agents, 14 pgs., (no date).
Bridge, Ralph, "Polymer Extrusion", [online], May 5, 1997, pp. 1-8 [retrieved on Jun. 14, 2001]. Retrieved from the Internet<URL: http://www.cngr.uconn.edu/cheg/polymer/ c256hnp.htm>.
Chart, "Resins and Compounds", Modern Plastics Mid-October Encyclopedia Issue, pp. 424-425 (1991).
Eaton, C.J., "Foam Extrusion" Primary Process, Modern Plastics Mid-October Encyclopedia Issue, vol. 67, No. 11, pp. 291-292 (1990).
Geelan, B.J., "Foaming Agents" Chemical & Additives, Modern Plastics Mid-October Encyclopedia Issue, vol. 67, No. 11, pp. 184-188 (1990).
Grelle, P.F. et al., "Ignition Resistant Polystyrene, A New Look at an Old Friend: The Cost Effective Alternative for the 90's", Proceedings from Structural Plastics '91 Conference and New Product Design Competition, pp. 145-155, (1991).
Harfmann Technology, Inc., Advertisement—"Carbon Dioxide/Nitrogen Metering Technology", 1 pg., (no date).
Han, C. D. et al., "Studies on Wire Coating Extrusion. I. The Rheology of Wire Coating Extrusion", Polymer Engineering and Science, vol. 18, No. 13, pp. 1019-1029 (Oct. 1978).
Ligon Brothers Manufacturing Company, "Metal & Plastic Stampings, Plastic Extrusions, Metal & Plastic Assemblies", 6 pgs, (1993).
Levy, Sidney, Handbook of Profile Coextrusion and Covering-Tooling and Systems Design, Construction, Operation, pp. 1-64, 1987.
Levy, Sidney, PE., "Handbook of Profile Extrusion-Tooling & System Design, Construction, Operation", pp. 1-109 (1987).
Levy, Sidney, PE., "Plastic Extrusion Technology Handbook", pp. 178-183 (1981).
Levy, Sidney, PE., "Plastic Extrusion Technology Handbook", pp. 189-201 (1989).
Marketing information excerpt, Fenestration, p. 66 (Jan./Feb. 2001).
Marketing information excerpt, Window & Door.TM., p. 52 (Jun./Jul. 2000).
Michaeli, Walter, "Extrusion Dies for Plastics and Rubber, 2'd rev. ed.", pp. 2-11,157-159, 166-173, 178-181 (1992).

(56) References Cited

OTHER PUBLICATIONS

Monsanto Technical Correspondence, "Extrusion Foaming Technology for SANTOPRENE.RTM. Thermoplastic Rubber, SANTOPRENE.RTM. Thermoplastic Rubber", 18 pages (May 10, 1988).

Monsanto Technical Note, "SANTOPRENE.RTM. Thermoplastic Rubber: The Vulcanized Rubber that Processes as a Thermoplastic" SANTOPRENE.RTM. Thermoplastic Rubber, 12 pages (1985).

Monsanto Technical Paper, "Extrusion Foaming Technology for SANTOPRENE.RTM. Thermoplastic Rubber (Revised)", SANTOPRENE.RTM. Thermoplastic Rubber, 16 pages (May 13, 1987).

Monsanto, "Physical Properties", SANTOPRENE.RTM. Thermoplastic Rubber, 20 pages (1987).

Monsanto, "SANTOPRENE.RTM. Thermoplastic Rubber: Glazing and Sealing Applications" SANTOPRENE.RTM. Thermoplastic Rubber, 12 pages (1987).

New England Urethane, Inc., Advertisement—"Corporate Profile", 1 pg., (no date).

New England Urethane, Inc., Advertisement—"On-Target Technology: Custom Compounding of Thermoplastic Elastomers", 2 pgs., (no date).

OMEGA Engineering Inc., Specification for "Low Flow Air Process and Liquid Circulation Heaters", Online Catalogue: Electric Heater Products, [online], p. J-20 [retrieved on Jan. 31, 2003]. Retrieved from the Internet<URL: http://www.omega.com/toc.sub.--asp/frameset.html?book=Heaters&file=AHPF.s- ub.--Heater>.

OMEGA Engineering Inc., Specification for the "'T' Type air Process Heaters for In-Line Air and Gas Heating", Online Cataogue: Electric Heater Products, [online], pp. J-17, J-18 [retrieved on Jan. 31, 2003]. Retrieved from theInternet:<URL:http://www.omega.com/toc.sub.--asp/frameset.html?book-=Heaters&file=AHP.sub.--SERIES>.

OMEGA Engineering Inc., Specification for the "OMEGALUX AH-66136 Process Air Heater", Online Catalogue: Electric Heater Products, [online], pp. J-15, J-16 [retrieved on Jan. 31, 2003]. Retrieved from the Internet:<URL: http://www.omega.com/toc.sub.--asp/frameset.html?book= Heaters&file=AHCHEATER>.

Paulson Training Programs, Inc., "Extrusion Technology: Study Guide for Courses 2 & 3, Sessions 7-12", 4 pages (1988).

Reedy International Corp., "SAFOAM.RTM. Product Selection: for Extrusion", 2 pgs., (no date).

Rogers, Tracy, "Weatherseals . . . Keeping Your Customers Warm and Dry," Window and Door Fabricator TM, pp. 48, 50-51 (Oct./Nov. 1997).

Shaw, David, "New Machinery Suggests Rise in Automotive TPEs," Rubber and Plastics News, 3 pgs., (no date).

Trexel Inc., "MUCELLTM Microcellular Extrusion Technology—Produce Lighter Weight Products Faster With a MuCell Extrusion License", 6 pages, (no date).

Ultrafab, Inc., "A Complete Range of Pile Weatherseals and Extruded Profiles and Weatherseals", 2 pgs., (no date).

Ultrafab, Inc., Advertisement, 1 pg., (no date).

Ultrafab, Inc., Advertisement—The UltraCell Bulb (1 pg.), shown at WIN-DOOR 2000, Toronto Congress Center, Toronto, ON (Nov. 15-17, 2000).

Ultrafab, Inc., Advertisement—Ultra-CellTM EPDM Foam-filled Bulb Seals, 1 pg., (no date).

Ultrafab, Inc., Advertisement—Ultra-Grip, USGlass, Metal and Glazing, 1 pg. (Mar. 2001).

Walker, B.M. et al., Handbook of Thermoplastic Elastomers—Second Edition, 4 pages (1988).

Partial International Search Report for PCT/US07/006056 dated Aug. 27, 2007, 5 pp.

Schenectady International, SP-1077, description and specifications, UM00040 Rev. 1 (01/01), 1 page.

\* cited by examiner

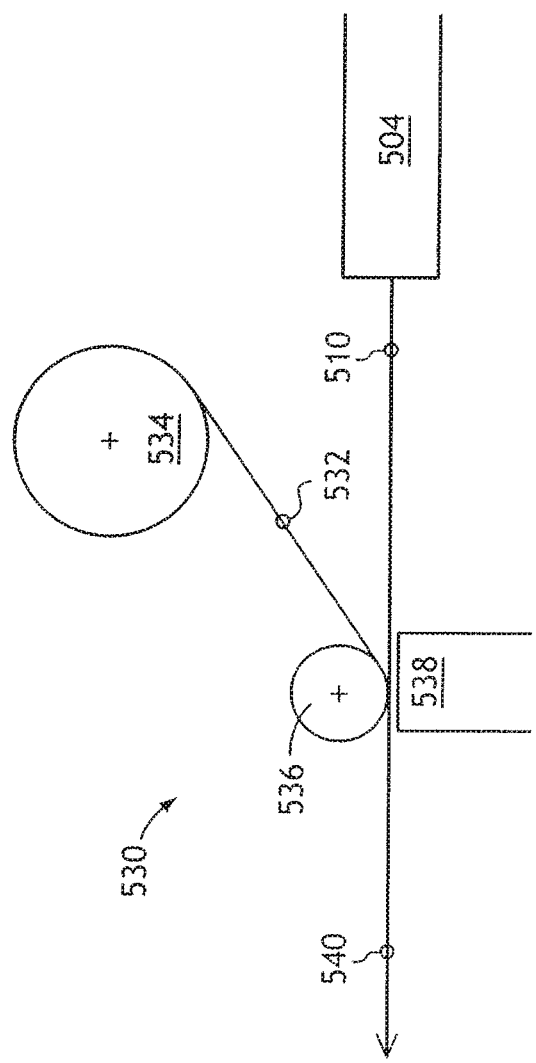

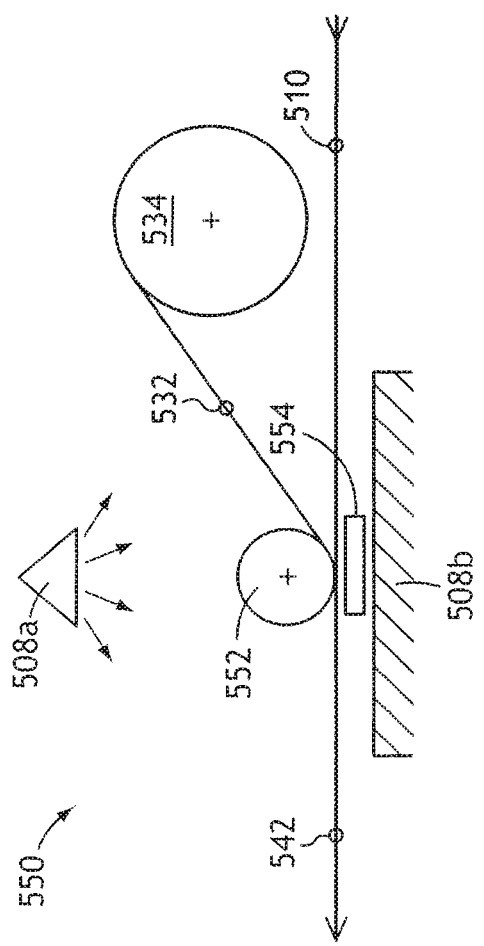

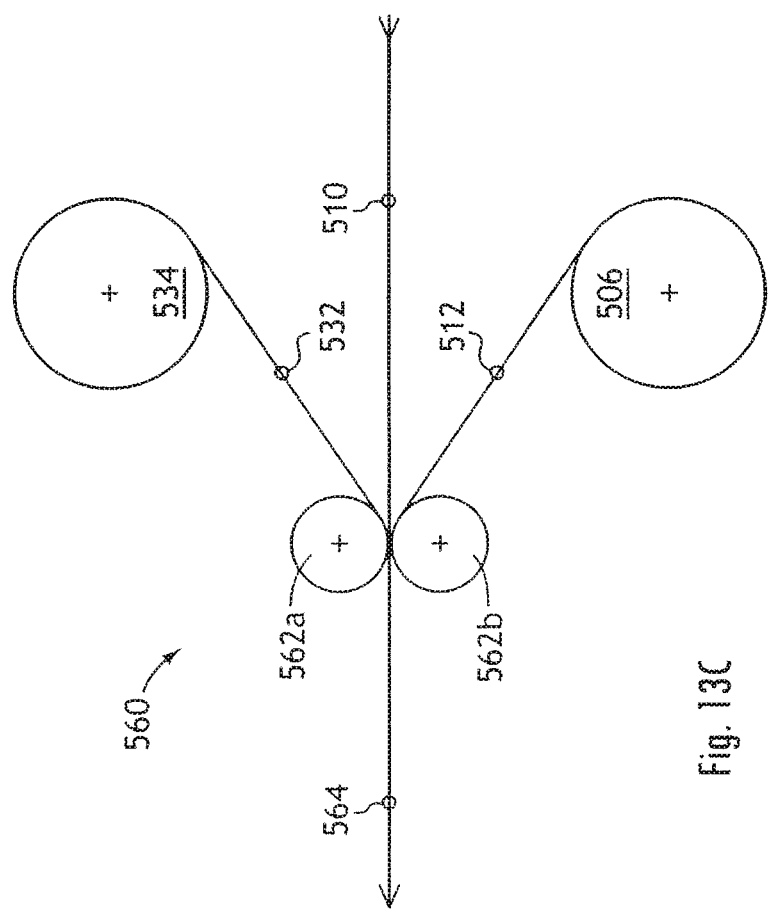

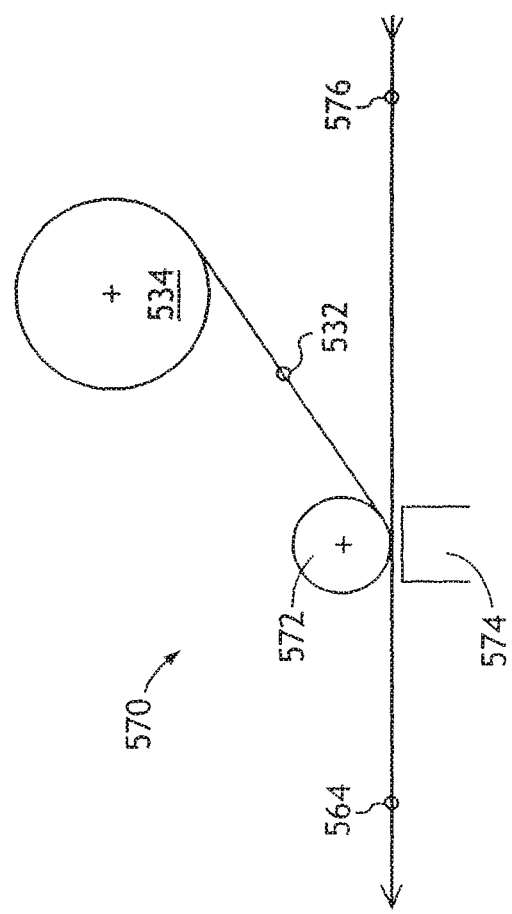

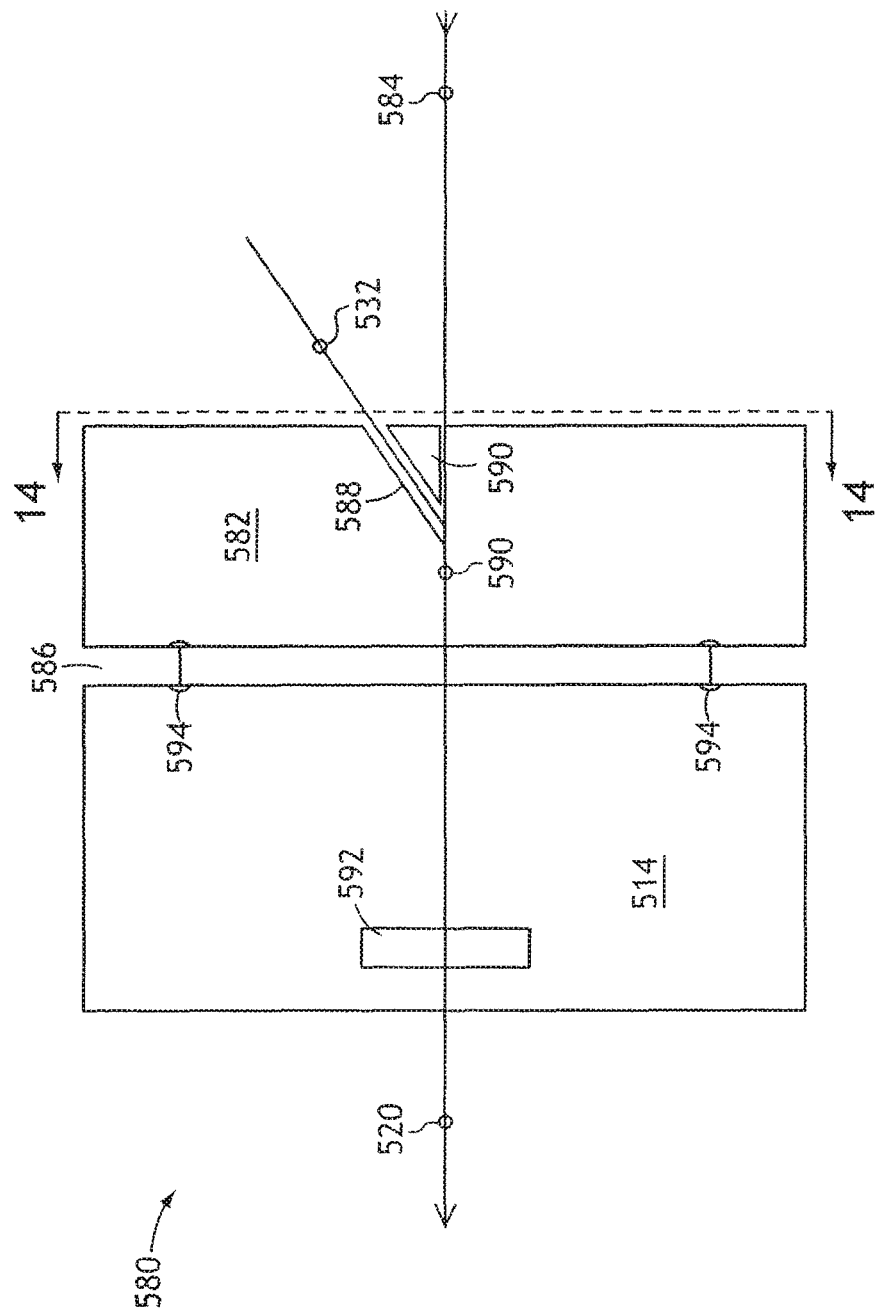

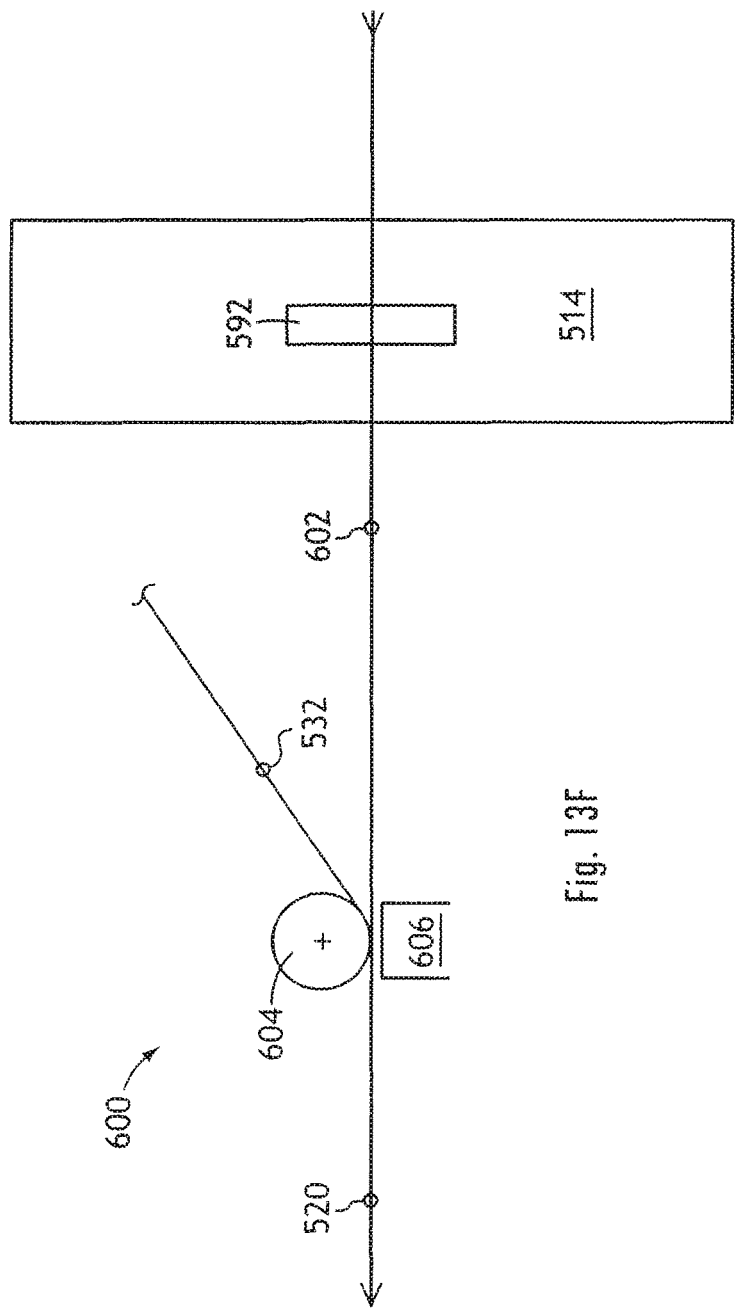

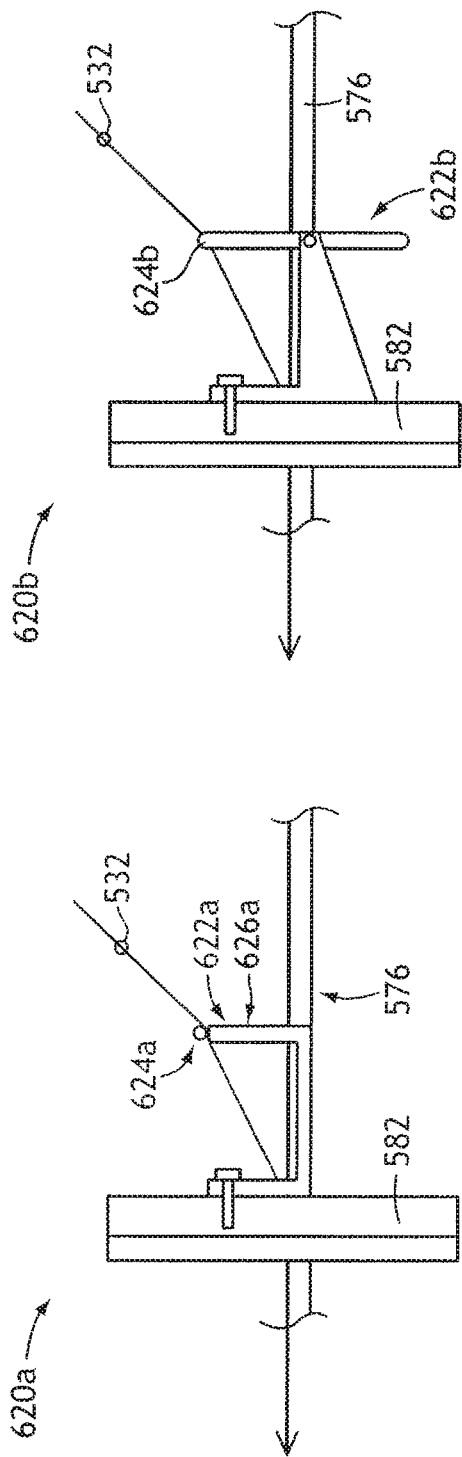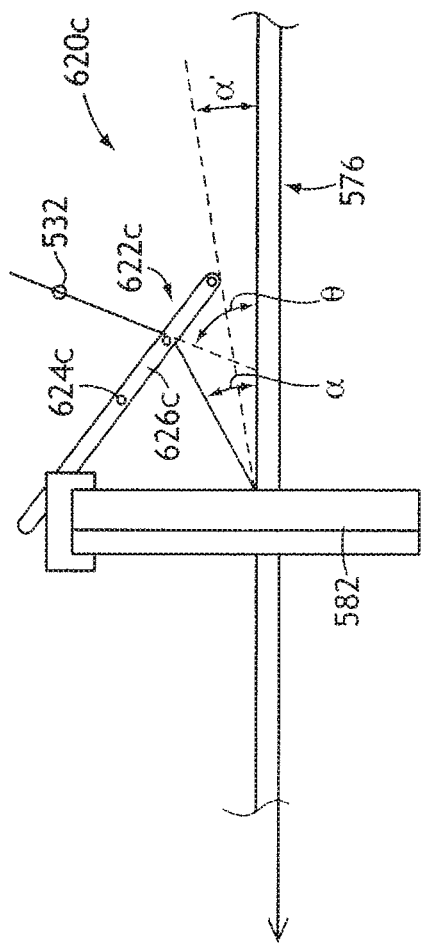

SYSTEMS AND METHODS FOR MANUFACTURING REINFORCED WEATHERSTRIP

CROSS-REFERENCE TO RELATED APPLICATION

This application is a divisional of U.S. application Ser. No. 12/690,405, filed Jan. 20, 2010, now U.S. Patent No. 9,358,716, which is a continuation of U.S. patent application Ser. No. 11/716,397, filed Mar. 9, 2007, now U.S. Pat. No. 7,718,251, which claims priority to U.S. Provisional Patent Application Ser. No. 60/780,991, filed on Mar. 10, 2006, all of which are hereby incorporated by reference herein in their entireties.

TECHNICAL FIELD

The present invention generally relates to methods, systems, and apparatus for fabricating a fabric-reinforced (clad) coated foam substrate, and the products manufactured by the disclosed methods, systems, and apparatus.

BACKGROUND OF THE INVENTION

Non-reinforced coated substrates may be manufactured by a number of methods, as described with reference to FIGS. 1-10 and in the accompanying text. The methods and systems associated with the manufacture of non-reinforced coated substrates are also described in U.S. Pat. No. 5,192,586 to Mertinooke et al., the disclosure of which and all references of record therein and in the reexamination proceeding thereof are incorporated by reference herein in their entireties.

In many applications, it is desirable to provide a relatively thin, outer layer or skin for a substrate, which may be a rigid or non-rigid foam profile or other material. The substrate may include a plurality of components, some rigid and some nonrigid. The layer or skin may perform a variety of functions, such as protecting the substrate from adverse external conditions, providing the external surface of the substrate or portions thereof with characteristics suitable for particular applications, providing an aesthetically appealing finished product, and the like. The outer layer or skin may also improve the tear resistance of the substrate and enhance overall strength providing a more durable and rugged finished product. A conducting wire surrounded by an insulating layer is one example of a substrate having an outer layer performing such functions. One such substrate which may include an outer layer or skin is a weatherseal or weatherstrip, embodiments of which are described herein, however, the method and apparatus described herein are not limited in this respect; indeed, it is broadly applicable where it is desired to provide an outer layer or skin for rigid and non-rigid substrates including, but not limited to, foams, metals, and previously extruded plastics.

In general, weatherseals seal joints or spaces around doors and windows so as to inhibit infiltration of air, rain, snow, and other elements. Effective weatherseals can reduce both heating costs in winter and cooling costs in summer. Certain characteristics are desirable to produce an effective weatherseal. First, a weatherseal should have good compression set resistance. Compression set resistance refers to the ability of a material to resume its initial shape after being subjected to a compressive load. Failure to resume this initial shape may result in an uneven seal and reduce the effectiveness of the weatherseal. Second, a weatherseal should be soft and yielding, i.e., it should be easily compressible and conform to irregular surfaces. The gaps in doors, windows and the like in which weatherseals are utilized differ in size due to construction and other factors, and a weatherseal should have sufficient compressibility to conform to a wide range of gap sizes. Compressibility also ensures that a door or window, for example, can be closed without excessive force and still compress the weatherseal sufficiently to form the necessary seal.

The prior art discloses many materials which are utilized as weatherseals. U.S. Pat. Nos. 4,328,273 and 4,185,416 disclose the use of urethane foams for a weatherseal. Commonly assigned U.S. Pat. Nos. 4,898,760, 5,192,586, 5,393,796, 5,512,601, 5,607,629, 5,654,346, 5,728,406, and 5,788,889, the disclosures of which are incorporated herein by reference in their entireties, disclose the use of a low density foamed thermoplastic elastomer for a weatherseal. However, these and similar materials may have relatively high coefficients of friction and may be easily damaged. Thus, their effectiveness and utility as a weatherseal may be reduced. These problems are magnified where the weatherseal is subjected to sliding contact or other abrasive forces; thus, a method of manufacturing a weatherstrip having reduced frictional characteristics when sliding against a surface is desirable.

In order to alleviate the problems described above, an outer layer or skin is typically provided for the weatherseal. The outer layer generally has a low coefficient of friction relative to the surface of contact to facilitate relative motion and may be generally flexible to permit compression of the underlying seal. The outer layer also protects the seal from rips and tears caused by sliding contact or other abrasive forces. Low friction materials such as polyethylene copolymers, polyvinylchloride, and polypropylene copolymers have been utilized in the prior art for this outer layer.

There are several disadvantages, however, associated with providing these low friction outer layers. Attaching the outer layer to the underlying seal may require a separate manufacturing step and increase the labor and associated costs required to make the seal. If the outer layer is applied as a crosshead extrusion to the weatherseal, orientation of the outer layer during "draw-down" onto the seal creates low resistance to tears along the length of the seal. Thus, an initially small tear in the outer layer can propagate into a much larger tear, adversely affecting the effectiveness and utility of the weatherseal. Additionally, crosshead extrusion apparatus generally requires complex arrangements of equipment and expensive dies. These factors also increase production costs.

One prior art technique provides an outer skin for a substrate by melting a resin and placing the melted resin in a tank or pool with an entrance opening and an exit opening. The substrate is then pulled or dragged through the melted resin. The exit opening serves as a doctor blade to configure the outer layer. However, it is difficult to precisely control the thickness of the outer layer or to selectively coat portions of the substrate utilizing this prior art technique. Also, it is difficult to provide an outer layer of varying thickness. Finally, the pressure and drag exerted on a non-rigid substrate such as a foam by a viscous melted resin deforms and stretches the non-rigid substrate and generates a low quality product.

SUMMARY OF THE INVENTION

Notwithstanding the benefits of substrates coated in accordance with the teachings of U.S. Pat. No. 5,192,586, there exists a need for more robust coated substrates to achieve heretofore unprecedented performance characteristics. FIGS. 11-19 and accompanying text describe embodiments of the present invention. The methods described in these figures may be incorporated into the methods of manufacture described in the former figures to produce fabric-reinforced coated substrates. The addition of a fabric layer or other reinforcing layer may be desirable for additional reinforcement, cushioning, or sealing. Certain fabrics have been elements of weatherstrip sealing products since their introduction in the 1980's, forming barriers against air and water infiltration as part of properly applied window and door system designs. The fabrics can contribute toward quiet operation, low friction (low operating forces), low water and air penetration, puncture resistance, tear resistance, colorability, UV resistance and long-term weatherability, chemical resistance, and thermal adhesion to olefin thermoplastic substrates.

Fabric clad weatherstrip offers many features such as design versatility, with many skin options utilizing an extruded polymer thermoplastic vulcanizate (TPV), for similar applications. Other performance characteristics may also be enhanced by varying the polymer grade and the layers of polymer added to the skin layers over the foam in order to solve specific application issues; however, some prior art solutions become cost prohibitive or unreliable to consider due to their complexity or raw material cost. One such challenge is the difficulty created by applying a weatherstrip in a meeting rail or in a jamb in a tilt double hung application, where lateral forces are generated on a highly flexible seal, causing it to tear.

In one aspect of this invention, the benefits of tear resistant, low friction polypropylene fabric are combined with the compression set resistance of TPV foam to provide a product of superior performance, utilizing an industry-proven TPV sealing component, while providing a cost effective production method of applying the fabric to the foam substrate. The fabric can be utilized to fully or partially encapsulate the foam core, and the extruded coating tie layer may bond to the inside of the fabric and to the stiffener for structural integrity and stability. In various embodiments, the fabric may be applied in strips to provide low friction areas, hinges, reinforced areas, chafe resistant areas, or color match areas in order to impart specific characteristics to the product. The underlying extruded layer of polymer may be simply a bonding material, requiring no UV protection or low friction characteristics, that being provided by the exterior layer, or it may be of lower cost material to simply act as a tie layer. The fabric may have a secondary extruded layer extruded onto or along the edges to protect them from catching and lifting with use. The secondary layer can utilize polyethylene, TPV, thermoplastic elastomer (TPE), polyester, polypropylene, acrylonitrile butadrene styrene (ABS), polystyrene ethylene butadiene styrene (SEBS), ethylene vinyl acetate (EVA), or other suitable and thermally compatible material.

The teachings of the invention can be practiced in many ways. One method is to apply a strip of fabric from a roll of material directly onto the skin coating, immediately after the skin has been applied, in a coat die while the skin is still in the molten state. The fabric may be pre-heated to enhance the bonding to the skin by the use of directed hot air or a hot plate. The fabric may travel over a roller downstream of the die opening, the roller being adjustable to apply appropriate pressure against the molten skin to achieve a bond. An alternative method is to attach a die plate to the front of the coat die with a channel cut upstream of the front plate at a right angle to the product, slightly larger than the size of the fabric. The fabric follows the channel to the freshly coated surface and attaches to the coating skin layer immediately after the coat die plate. The fabric application plate may utilize a profile cavity configured so as to exert pressure on only the part of the product where the fabric is being applied, the rest of the area being relieved, so as not to interfere with the cooling of the remainder of the molten skin layer.

In another aspect, the invention relates to a method of applying a reinforcing material to a coated substrate including a foam profile, a stiffener, and a resin coating, the method including the steps of providing a reinforcing material application station downstream from a resin coating station, a stiffener application station and a foam profile extruder, and applying the reinforcing material to the substrate after application of a resin coating, while the resin has a substantially liquid state. In an embodiment of the above aspect, the reinforcing material application station includes a pressure roller.

In another aspect, the invention relates to a method of making a weatherstrip, the method including the steps of providing a foam profile, providing a reinforcing material, and passing at least a portion of the profile through a coating die to coat the profile with a resin, wherein the resin attaches the reinforcing material to the weatherstrip. In certain embodiments of the above aspect, the coating substantially covers the reinforcing material.

In another aspect, the invention relates to a weatherstrip having: a foam profile, a coating layer disposed along at least a portion of the foam profile, and a reinforcing material at least partially in contact with the coating layer. In embodiments of the above aspect, the reinforcing material is disposed between the foam profile and the coating layer. In other embodiments, the reinforcing material is disposed on an outer surface of the coating layer, and may include a stiffener.

In another aspect, the invention relates to an apparatus for manufacturing coated weatherstrip, the apparatus having a foam extruder, a stiffener roll, a coating die and coating extruder, and a puller. In certain embodiments of the above aspect, the apparatus includes a heat source, which may be a hot plate and/or a hot air discharge to heat the foam after extrusion. In certain embodiments, the apparatus includes a fabric applicator, which may be located at or near the outlet of the foam extruder. In certain embodiments, the applicator may be located at the heat source, or it may be located where the stiffener is secured to the foam. Alternatively, the applicator may be located beyond the stiffener application location. In other embodiments, the fabric applicator may be integral with the coating die, or may be located between the coating die and the puller.

In another aspect, the invention relates to an apparatus for manufacturing coated weatherstrip, wherein the fabric applicator for securing the fabric to the extruded foam is a roller, the roller being used with an opposing roller or a support plate. In embodiments of the apparatus where a heat source is utilized, the roller and/or support plate or roller may serve as the heat source. In certain embodiments of the above aspect, where the fabric is applied to the extruded foam at the point of application of the stiffener, the apparatus may include one or more pressure rollers. In other embodiments, the fabric applicator may be a plate and/or a fabric applicator die. In embodiments of the above aspect that utilize a die, the die may be attached to the coating die with or without a thermal break.

Accordingly, it is an object of the present invention to provide a method and apparatus for coating a substrate which is simple and relatively low in cost. It is another object of the present invention to provide a method and apparatus for coating a substrate which produces a less oriented outer layer. It is still another object of the present invention to provide a method and apparatus for producing a substrate having a multiple-component outer layer. It is still another object of the present invention to provide a method and apparatus for providing a substrate with an outer layer of varying thickness which may be selectively applied to portions of the substrate. It is still another object of the present invention to overcome the disadvantages of the prior art.

In another aspect, the invention relates to a method of making a weatherstrip having a foam profile, a resin coating, and a cover layer, the method including the steps of providing the foam profile, providing the cover layer, and passing the cover layer and the foam profile through a resin coating station, wherein at least a portion of the cover layer is coated with the resin, while the resin is in a substantially liquid state. In embodiments of the above aspect, the method also includes the step of applying the cover layer to at least a portion of the foam profile. Other embodiments include the step of attaching a stiffener to at least one of the foam profile and the cover layer. In certain of those embodiments, the passing step further includes passing the stiffener through the resin coating station, which may coat at least a portion of the stiffener with resin. In other embodiments of the above aspect, the cover layer includes an edge, at last a portion of which is coated with the resin. In still other embodiments, the cover layer includes a coated side and a reverse side, and the reverse cover layer side is disposed proximate to the foam profile. In certain of those embodiments, the coated cover layer side and the resin form a bond upon contact. Additional embodiments of the above aspect adhere at least a portion of the cover layer to at least a portion of the foam profile. Still other embodiments include the steps of providing a forming station upstream from the resin coating station, and passing the cover layer through the forming station to preform the cover layer to a shape corresponding to a shape of the foam profile.

In yet another aspect, the invention relates to a method of making a weatherstrip having a foam profile, a resin coating, and a cover layer, the method including the steps of providing a foam profile, passing the foam profile through a resin coating station, wherein at least a portion of the foam profile is coated with the resin, while the resin is in a substantially liquid state, and applying the cover layer to at least a portion of the foam profile. In certain embodiments of this aspect, the portion of the foam profile to which the cover layer is applied is coated with the resin. Additional embodiments of the above method include the step of attaching a stiffener to at least one of the foam profile and the cover layer, and may include passing the stiffener through the resin coating station, which may coat at least a portion of the stiffener with resin. Certain embodiments of the above aspect include the step of applying the cover layer to the foam profile prior to the passing step. In other embodiments the cover layer is applied to the foam profile with at least one roller, which may occur while the resin is in a substantially liquid state. Certain embodiments of any of the above aspects may include a cover layer, wherein the cover layer forms at least one wand, and/or the cover layer may be abraded.

In other aspects, the invention relates to a weatherstrip made in accordance with any of the above-recited methods. In another aspect, the invention relates to a weatherstrip having a foam profile, a stiffener, and a cover layer over the foam profile attached to at least one of the foam profile and the stiffener along longitudinal edges of the cover layer, so as to decouple at least a portion of the cover layer from the foam profile. In another aspect, the invention relates to a system for manufacturing weatherstrip, the system having a foam profile source, a stiffener source, a cover layer source, a resin source, a device for attaching the stiffener to the foam profile, a device for at least one of applying the cover layer to at least a portion of the resin and applying the resin to at least a portion of the cover layer, and a device for coating with resin at least a portion of at least one of the foam profile and the stiffener. In still another aspect, the invention relates to a method of making a weatherstrip having a cover layer and at least one of a foam profile and a stiffener, the method including the steps of providing the cover layer, providing at least one of the foam profile and the stiffener, applying at least a portion of the cover layer to the at least one of the foam profile and the stiffener to create a combined component, and passing the combined component through an ultrasonic welding station, thereby securing at least a portion of the cover layer to the at least one of the foam profile and the stiffener.

BRIEF DESCRIPTION OF THE DRAWINGS

A more complete appreciation of the invention in accordance with the depicted embodiments and many of the attendant advantages thereof will be readily obtained by reference to the following detailed description when considered in connection with the accompanying drawings, in which:

FIGS. 13A-13F are block diagrams of various embodiments of fabric application processes suitable for use in the manufacturing apparatus depicted in FIG. 12;

FIGS. 15A-15C are schematic side views of fabric applicators in accordance with other embodiments of the present invention;

DETAILED DESCRIPTION

Figure 1:
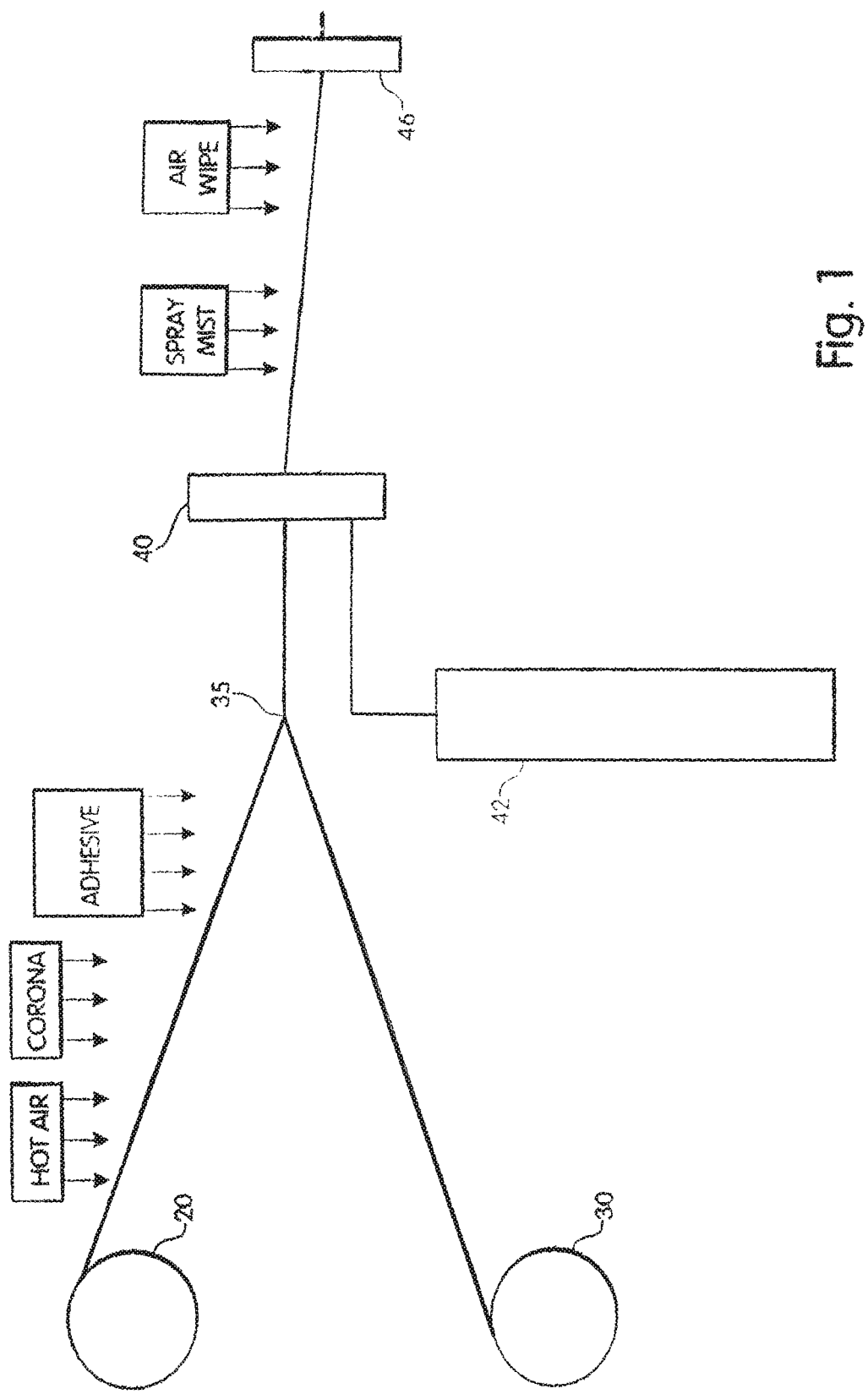
FIG. 1 is a block diagram illustrating the overall operation of one embodiment of an apparatus for manufacturing coated weatherstrip.

FIG. 1 schematically illustrates the overall operation of one embodiment of an apparatus for manufacturing coated weatherstrip. The product produced in this process is a weatherseal of the type shown in FIG. 4, which includes a foam body or profile with a thin skin or coating and having bonded thereto a stiffener which is used to attach the weatherseal to a structure, such as a door or window jamb. The stiffener is supplied from a reel 20. The stiffener is first heated to approximately 120°-240° F. by a hot air blower, for example, in order to slightly soften the stiffener and to facilitate the removal of twists or bends in the stiffener as it is uncoiled and subjected to longitudinal tension. The heating also increases the temperature of the stiffener which permits a more secure bond to be formed with the adhesive and skin material in processing steps described below.

The stiffener is then subjected to a corona treatment or other surface treatment method to enhance bonding of the adhesive to the stiffener and the skin to the stiffener. Next, an adhesive is applied to the stiffener. The adhesive may be applied by a conventional hot melt system or other methods. The adhesive may be chosen to effect secure bonding of the foam to the stiffener. It will be recognized by those skilled in the art that the adhesive utilized will depend on the materials to be bonded as well as the temperatures the resultant structure will experience during subsequent processing steps and in use as a weatherseal. In one embodiment, effective bonding of low density SANTOPRENE® foam to a polypropylene stiffener is achieved with hot melts such as EXTREME ADHESIVES® ADT-067 or other amorphous polypropylene based hot melts, or thermoplastic rubber-based pressure sensitive hot melts. SANTOPRENE is manufactured by Advanced Elastomer Systems, LP. EXTREME ADHESIVES ADT-067 is manufactured by Adhesive Engineering & Supply, Inc. The characteristics and properties of SANTOPRENE are disclosed in U.S. Pat. Nos. 4,130,535 and 4,311,628, the disclosures of which are incorporated by reference herein in their entireties. SANTOPRENE is a thermoplastic elastomeric composition including blends of olefin rubber and thermoplastic olefin resin.

Foam is supplied from a reel 30. The foam is preferably a low density thermoplastic elastomeric foam described in the aforementioned patents. The foam is bonded to the stiffener to which the adhesive has been applied at a point schematically indicated at 35. In order to secure an effective bond, the foam may advantageously have no longitudinal tension as it is bonded to the stiffener.

The foam-stiffener combination is then pulled through a coating die, such as die 40, where an outer layer or skin of a melted resin produced by an extruder 42 is applied. The details of the application of this outer layer or skin are discussed below. After being pulled through the die 40, the resultant weatherseal is cooled by a spray mist of water, a water bath, or forced air. An air wipe subsequently removes excess water from the weatherseal, if necessary. The coated weatherseal passes through a puller 46 prior to storage or packaging. The puller 46 generates the necessary force for pulling the foam-stiffener combination throughout the above-described operation. Generally, the puller may produce a line speed in ranges from about 10 to 200 feet per minute to about 50 to 100 feet per minute. In certain embodiments, the line speed for producing the weatherstrip is about 60-75 feet per minute; in other embodiments, the line speed is about 75-100 feet per minute. Factors such as the surface area of the substrate or portions thereof which are to be coated effect the line speed and may be taken into consideration.

It is not necessary that the foam and stiffener be unwound from reels. It is possible, for example, for either the foam or stiffener or both to be extruded in line with the apparatus of the present invention. Such an arrangement requires proper control of the various line speeds but results in a single production line for the product.

Figure 2:
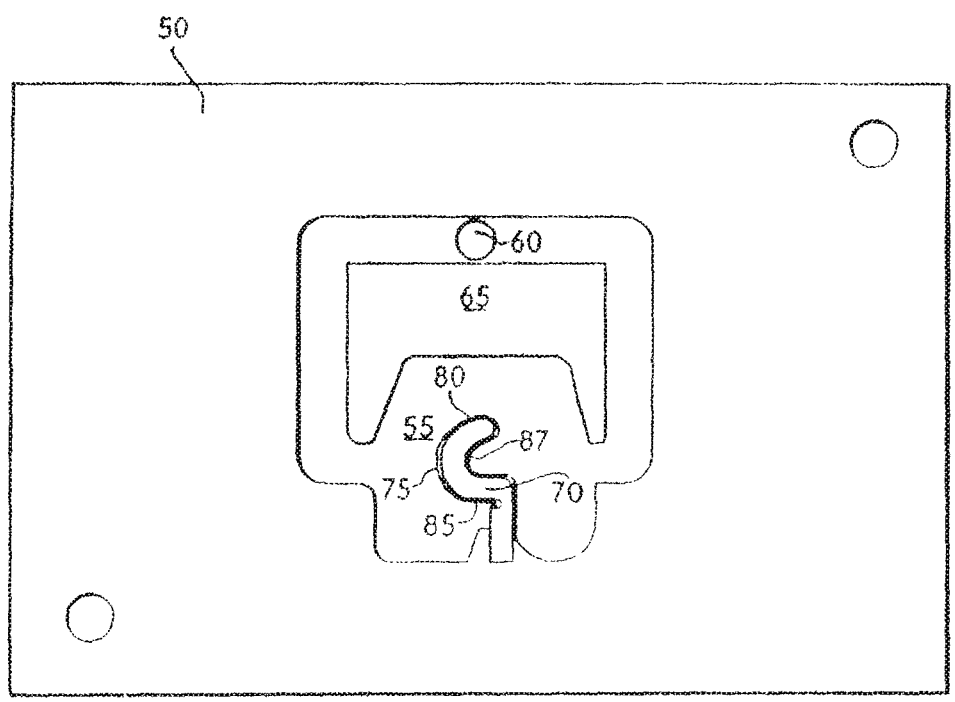
FIG. 2 is a plan view of a die plate in accordance with one embodiment the coated weatherstrip manufacturing apparatus of FIG. 1.

With reference to FIG. 2, a die plate 50 of the die 40 is typically formed of metal and has a thickness ranging from about 0.5 to 0.75 inches. These dimensions, however, will vary with the requirements of the particular coating process. The die plate 50 includes a resin channel 55 formed on one side thereof. The resin channel 55 has a depth of approximately 0.25 inches. As noted with respect to die thickness, this dimension is not critical and may be varied in accordance with the requirements of a particular coating process. An opening 60 is coupled to the output of an extruder 42 shown in FIG. 1. The opening 60 admits resin melted by the extruder 42 into the resin channel 55. Although the resin admitted to the resin channel 55 in the present embodiment is produced by an extrusion apparatus, this is not a necessary requirement. For some materials, the application of sufficient heat will create a melt which may be forced into the die under pressure by conventional pumping techniques. The pressure is approximately 100 pounds per square inch (psi) and may vary between about 50 and 1000 psi depending on the coating process. Some polymers, however, may require both heat and shearing action to produce a melt and therefore require an extrusion apparatus. Still other resins for coating a substrate, such as latex type resins, are room temperature liquids and hence do not require melting and may simply be forced into resin channel 55 under pressure.

The melted resin admitted to the resin channel 55 via the opening 60 is divided into two streams by a die portion 65. The resin within the resin channel 55 is at a pressure determined by the operating conditions of the extruder 42 (e.g., temperature, screw speed, temperature profile, etc.), the die configuration and the metering gap (described below). Increasing the screw speed of the extruder 42, for example, increases the pressure within the resin channel 55. As discussed below, the pressure within the resin channel 55 controls the thickness of the coating layer or skin deposited on the substrate.

Figure 3:
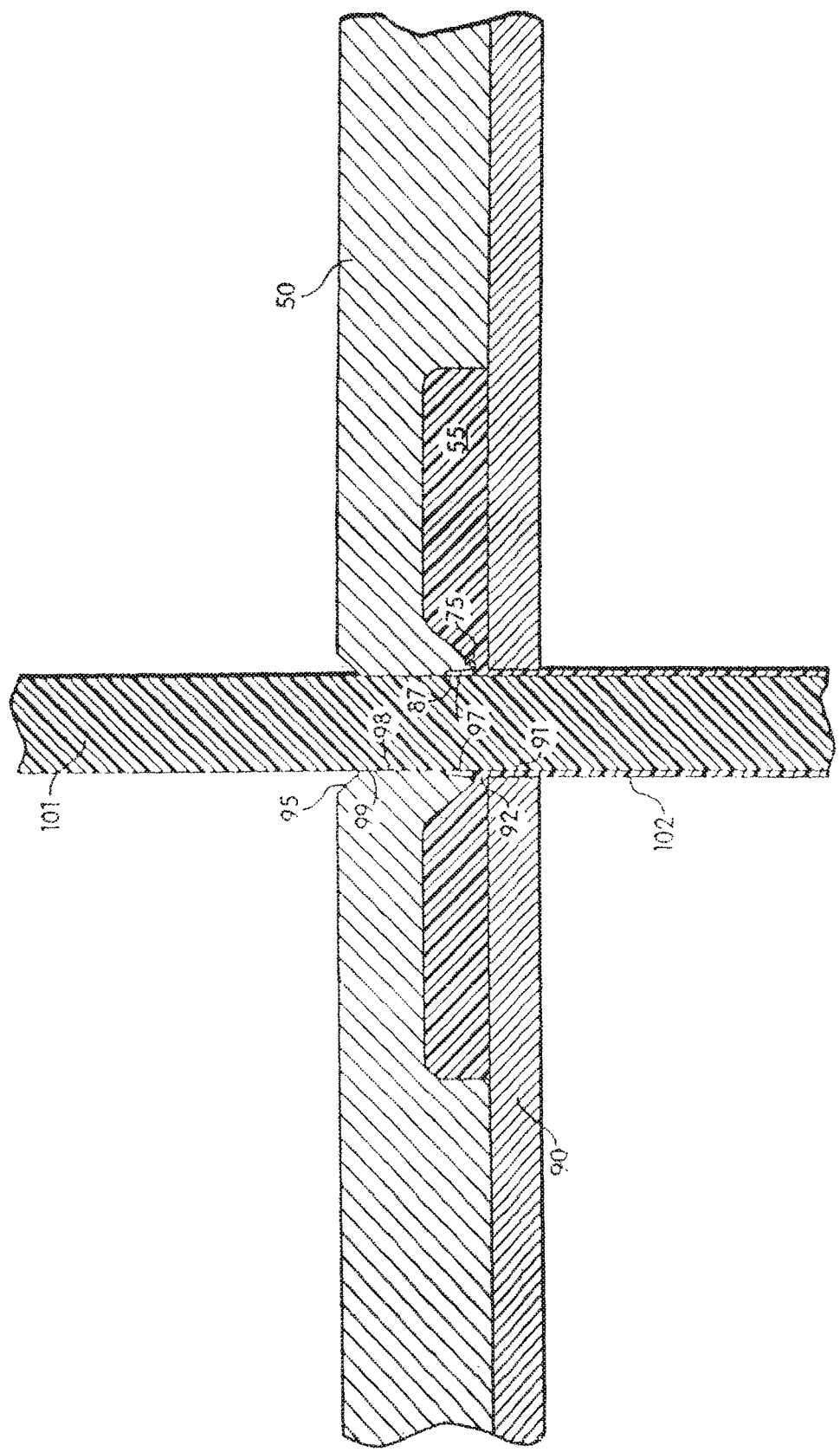
FIG. 3 is a cross-sectional view illustrating the coating of a substrate using the die plate of FIG. 2.

A die opening 70 is formed with a wall portion 75 having varying heights or thicknesses. The illustrated die opening is configured to produce the door or window seal of FIG. 4. It will be recognized that the die opening 70 may be configured to coat substrates of any shape in accordance with the discussion below. As detailed below, the height of the wall portion 75 varies in accordance with the position of the wall portion in the resin channel 55 and the thickness of the outer layer or skin desired on the substrate at that point. The die plate 50 cooperates with a face or scraper plate 90 having an opening 91 therein corresponding to the die opening 70 and which is secured thereto in a manner to enclose the resin channel 55 as shown in FIG. 3. The gaps between the face plate 90 and the wall portion 75 form a metering gap 92 for the resin.

The pressure within the resin channel 55 is a function of position therein and generally decreases with increasing distance from the opening 60 so as to generate a range of pressures within the channel 55. Therefore, in order to provide a layer of uniform thickness to a substrate, the height (or thickness) of the wall portion 75 may be varied such that the size (or length) of the metering gap 92 is correlated with the pressure at that point to generate a uniform resin flow onto all portions of the substrate. For example, the height of the wall portion at point 80 should be greater than the height of the wall portion at point 85 since the pressure on the resin at point 80 is greater than the pressure on the resin at point 85. The decreased wall portion height at point 85 forms a larger metering gap and permits a greater volume of melted resin to flow between the face plate 90 and the wall portion to compensate for the reduced pressure and the flow characteristics of the material being applied. Additionally, the thickness of the wall may be varied by adjusting the length of the land on the top of the wall portion, as required for particular applications.

The size of the height of metering gap 92 varies between about 0.00 to 0.2 inches in one embodiment for the door seal. The size of the metering gap may vary depending on the requirements of particular coating operation. The size of the metering gap at various portions of the resin channel may be varied to provide a uniformly thick skin or to provide a skin whose thickness varies depending on position. The ability to provide a skin of varying thickness is an advantage over techniques of pulling a substrate through a pool of melted resin. In such techniques, the thickness of the skin is not easily controlled and may cause different portions of the substrate to be coated with different thicknesses.

An optional ridge 87 illustrated in FIG. 3, is formed on an inner side of the wall portion 75. The ridge 87 is spaced approximately 0.050 inch below the top of the adjacent wall portion and is approximately 0.030 inch wide in one embodiment. The 0.050 inch spacing is not critical and the ridge 87 is not necessary. Generally, if included, the spacing should be sufficient to provide a pocket 97 of reduced pressures as compared with the first range of pressures within resin channel 55. The pocket 97 is thus maintained within a second pressure range, the pressures in the second pressure range being lower than pressures in the range of pressures in resin channel 55. The pressures in the second pressure range are generally about atmospheric pressure. The ridge 87 further forms a shoulder which can prevent some of the wall portion 75 from contacting a substrate 101 as it is pulled through the die. It has been determined that if an excessive length of wall portion 75 contacts the substrate 101, a uniform skin may not obtained and a product of low quality may be produced in certain instances. In some instances, the ridge 87 permits the resin from the resin channel 55 to flow through the metering gap 92 into the pocket 97 at a lower pressure from where it subsequently flows onto the substrate 101 being pulled through the die opening 70. Thus, a low pressure thin stream of resin flows into the pocket 97. Although the resin is at high pressure in resin channel 55, the ridge 87 may form a low pressure region or a pocket 97 for applying the resin to the substrate 101. The application of the resin at approximately atmospheric pressure aids in the production of a uniform skin. Testing has demonstrated, however, that neither the ridge 87 or the pocket 97 are required to produce a high quality uniform coating.

The face plate 90 is secured to the die plate 50 by screws for example (not shown). The substrate 101 enters the die through a tapered lead 95. The tapered lead 95 ends in a contact surface or shoulder 99. The shoulder 99 and the surface 98 serve to position the substrate 101 in the die opening and further prevent the resin from traveling back away from face or scraper plate 90. The resin coated on to the substrate is doctored by the face plate 90 made of metal with the door seal profile cut therein to produce an outer layer 102. Thus, a low pressure, thin stream of resin is forced into the pocket 97 from all sides and as it contacts the substrate, it is doctored.

The thickness of the skin applied to a substrate generally depends on the line speed, the volumetric flow rate of the resin, and the doctoring by the face plate. However, assuming a constant line speed, the coating of rigid and non-rigid substrates seems to have slightly different mechanisms. The thickness of the skin on a non-rigid substrate such as foam appears to be determined by the metering gap and the pressure in the resin channel. As more material is forced through the metering gap, the non-rigid substrate is deflected or compressed more and a thicker skin is produced. If not as much material is forced through the metering gap, the non-rigid substrate is deflected or compressed less and a thinner skin is produced. The face plate does not appear to play a critical role in determining the skin thickness for non-rigid substrates or non-rigid portions of substrates. However, there is much less deflection with a rigid substrate and the face plate plays a more important role in determining thickness by scraping or doctoring the applied resin. In the die configuration of the above-described embodiment, the rigid portion of the door seal passes through the die opening at a point remote from opening 60, and consequently, the resin is at a relatively low pressure. It is important to ensure that sufficient material is supplied to provide a skin for the rigid portion. A flow channel may be cut into the face plate to increase the resin flow at that point. In various embodiments, some or all of the resin channel may be formed in the face plate.

Figure 4:
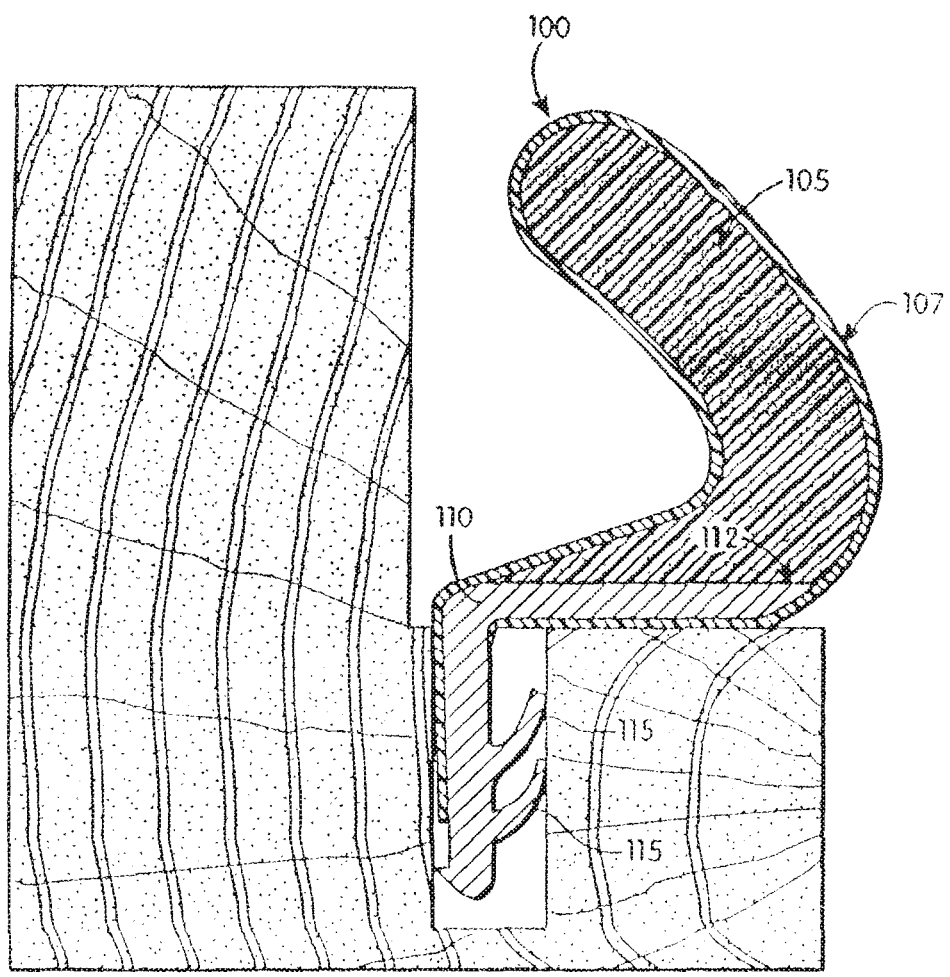
FIG. 4 illustrates a weatherseal formed in accordance with one embodiment of the coated weatherstrip manufacturing apparatus of FIG. 1.

Utilizing certain embodiments, it is also possible to coat only selected portions of a substrate by providing no metering gap at particular points in resin channel 55. That is, at particular points, the top of wall portion 75 abuts face plate 90 and no resin flows though. This may be desirable in applications such as weatherseals where portions of the seal perform functions adversely affected by the application of a skin. The door seal of FIG. 4 depicts such a situation. A door seal 100 includes a foam profile 105 and a stiffener or attachment device 110. An adhesive layer 112 bonds the foam profile 105 to the stiffener 110. The stiffener 110 includes barbs 115, which secure the door seal 100 in a jamb or the like. As noted above, the skin 107 should have a low coefficient of friction in order to facilitate the opening and closing of a door. However, this low friction skin 107 should not cover the barbs 115, so that the seal can be effectively secured to the door jamb. A low friction layer covering the barbs 115 would inhibit their ability to maintain a secure attachment. Such selective application of a skin can not be obtained by pulling or dragging the door seal through a pool of melted resin.

In certain embodiments, the applied resin may also be sufficiently hot to form a thermal bond with those portions of the substrate to be coated. In one embodiment, the SANTOPRENE foam and the polypropylene stiffener are coated with a non-foamed SANTOPRENE-blend skin. The SANTOPRENE blend preferably consists of 750 parts of SANTOPRENE 221-64, 250 parts of SANTOPRENE 223-50, 50 parts Ampacet #10061 (a slip additive), and 80 parts of a color concentrate. The numerical designation following "SANTOPRENE" is a commercial product code which defines certain characteristics of the SANTOPRENE grade. The SANTOPRENE blend is extruded from a single screw extruder. The temperature of the melted SANTOPRENE blend should be approximately 480° F. to form a thermal bond with the stiffener and the foam. The SANTOPRENE-blend skin has a relatively low coefficient of friction, is soft and compliant, has good strength and has a good resistance to compression set. The SANTOPRENE-blend skin also achieves a good thermal bond with the SANTOPRENE foam and the polypropylene stiffener.

The above-described method may be utilized with resins having a wide range of viscosities. Suitable skin materials for appropriate rigid and non-rigid substrates (or combinations of the two) include thermoplastic polymers such as olefinic plastic/olefinic rubber blends, partially or fully cross-linked rubber versions of the above including SANTOPRENE, polyethylene, ethylene/methacrylic acid copolymer, ethylene/ethyl acrylate polymer, linear low density polyethylene polymers and copolymerizations therewith, ethylene interpolymer/chlorinated polyolefin blends, ionomers (SURLYN®), polypropylene and polypropylene copolymers, nylon, polyesters, and thermoplastic polyurethane and mixtures thereof. SURLYN is a registered trademark of DuPont. As noted above, room temperature liquid resins such as latex emulsions compounded from silicones, acrylics, polyurethanes, and natural or synthetic rubbers may also be used.

Figure 5:
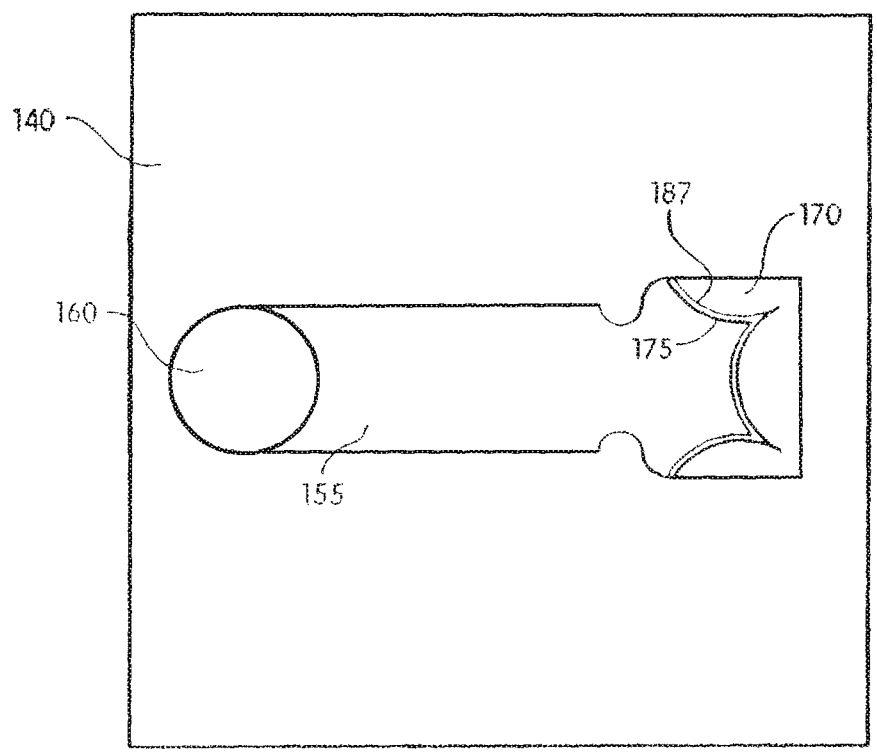
FIG. 5 is a plan view of a die plate in accordance with another embodiment of the coated weatherstrip manufacturing apparatus of FIG. 1.
Figure 6:
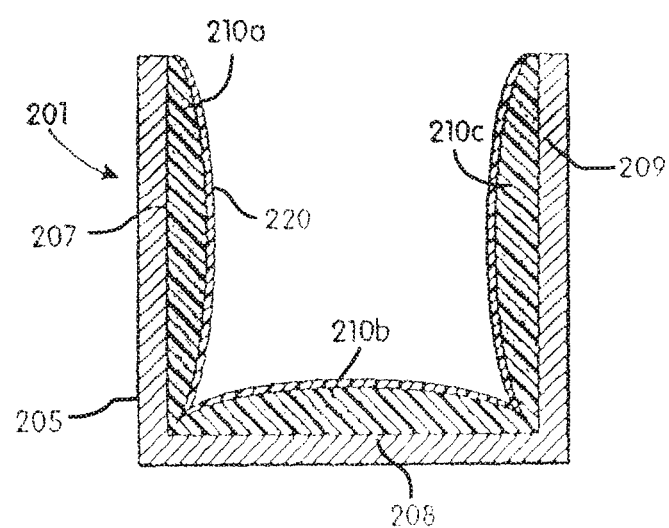
FIG. 6 illustrates a glass run channel formed with the die plate of FIG. 5.

A die plate utilized to manufacture coated weatherstrip and the resulting weatherstrip is illustrated in FIGS. 5 and 6. FIG. 5 illustrates a die plate generally indicated at 140. The die plate 140 includes a resin channel 155 formed on one side thereof and an opening 160. A die opening 170 is formed with wall portions 175 having varying heights and having a ridge 187 formed on the inner surface thereof. The die portion illustrated in FIG. 5 is configured so as to produce the glass run channel 201 of FIG. 6. The glass run channel 201 includes a roll-formed metal channel 205 having semi-cylindrical foam portions 210a, 210b, 210c adhesively secured to inner walls 207, 208, 209 respectively.

In order to coat the surfaces of foam portions 210a, 210b, 210c with an outer layer 220, the glass run channel 201 is pulled through the channel of die opening 170. Resin is forced by pressure in resin channel 155 through metering gaps formed by wall portions 175 and a corresponding face plate (not shown) in a manner similar to that discussed with respect to the above described embodiment.

The methods and apparatus described herein may also be utilized to provide multiple outer layers to a substrate. Thus, with reference to FIG. 7, a substrate such as the foam-stiffener combination described above may be pulled through the die 340 having a liquid resin supply 345 and be coated with a first outer layer. If it were desired, for example, to provide strips of a lower friction material over the first outer layer in order to produce a low friction contact surface, the foam-stiffener combination with the first outer layer could be pulled through a second die 350 having a liquid resin supply 355. This would generate the low friction strip 345 on a weatherseal 310 as illustrated in FIG. 8. For example, the first die may apply a skin utilizing the above-referenced the SANTOPRENE blend while the second die may apply a latex skin as a low friction overcoat. The heat from SANTOPRENE cures or dries the latex. Alternatively, the second die may pump a slurry of water and micronized polyethylene or tetrafluorethylane powder or silicone powder or other low friction material onto the hot SANTOPRENE. It will be apparent that this second layer may cover all or any portion of the first layer in accordance with the desired final product. It will also be apparent that any number of layers may be provided. Embodiments of a product utilizing a low friction layer, and systems and methods of manufacturing same, are described in more detail below.

Figure 7:
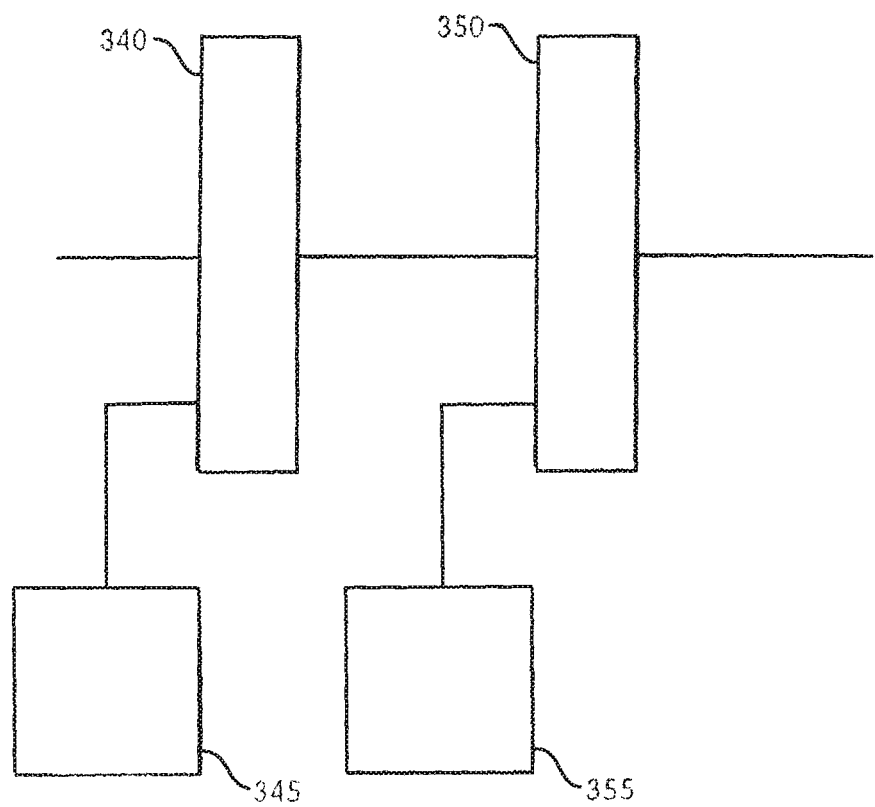
FIG. 7 is a partial block diagram illustrating the operation of another embodiment of a coated weatherstrip manufacturing apparatus.
Figure 8:
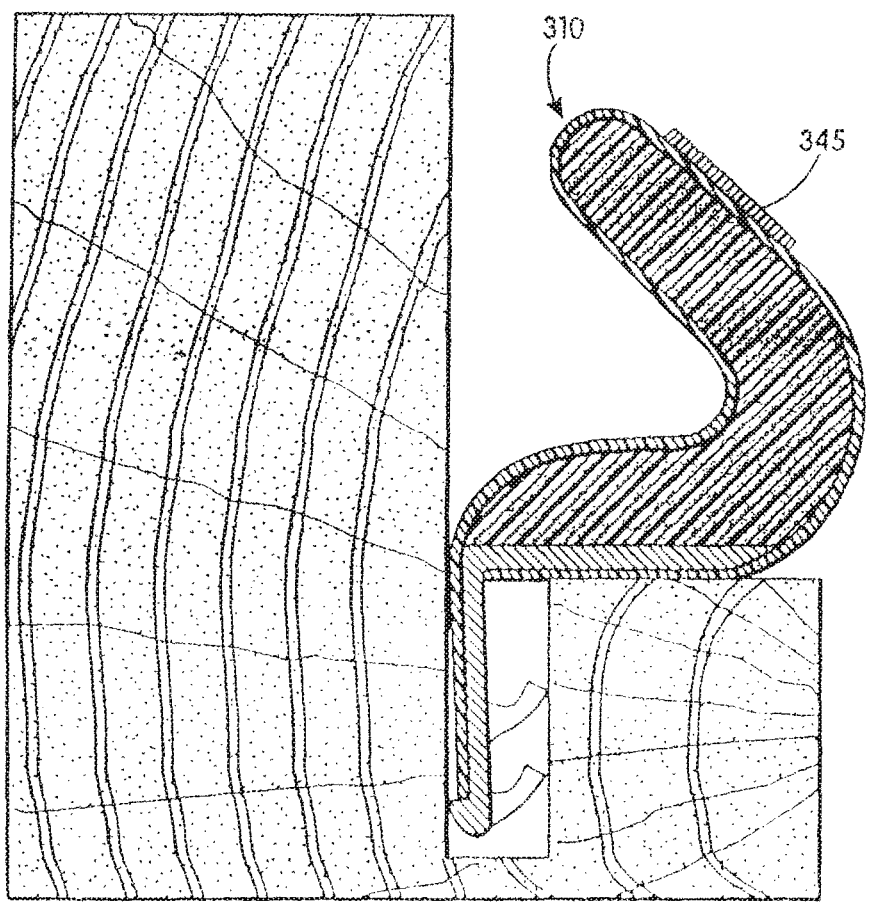
FIG. 8 illustrates a weatherseal formed in accordance with the embodiment of the coated weatherstrip manufacturing apparatus of FIG. 7.
Figure 9:
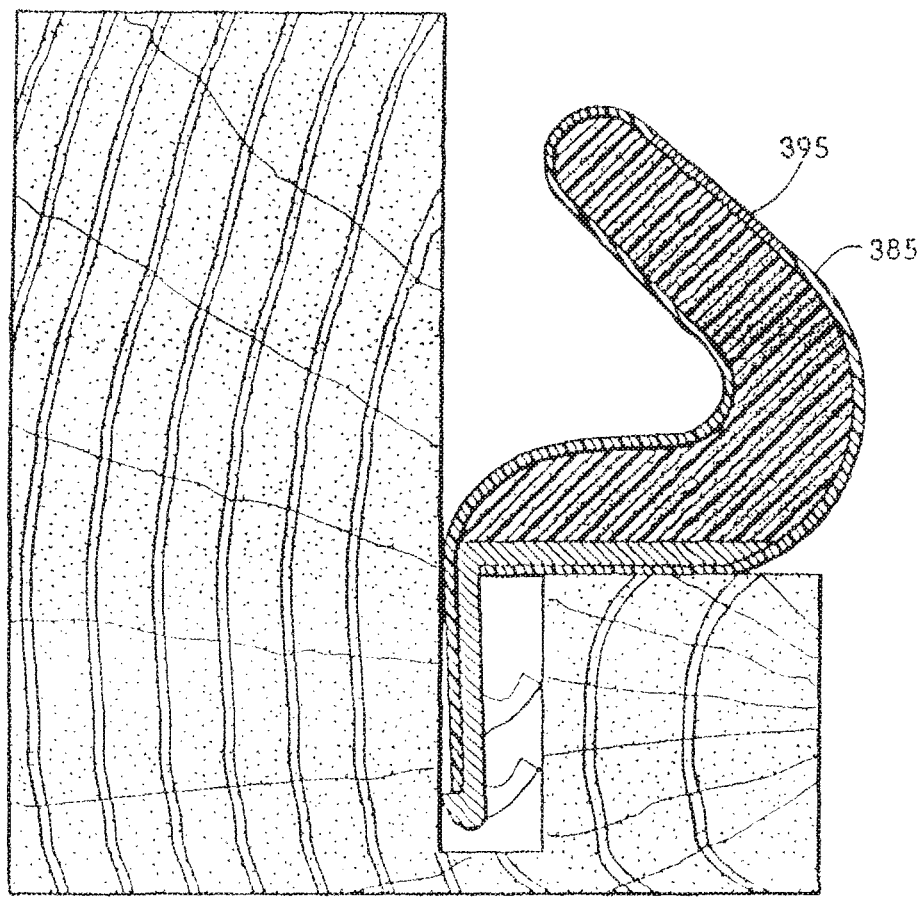
FIG. 9 illustrates another weatherseal formed in accordance with another embodiment of the coated weatherstrip manufacturing process.

Still another embodiment of the method of manufacturing coated weatherstrip may utilize the multiple die arrangement of FIG. 7. A substrate such as the foam-stiffener combination described above may be pulled through the die 340 and be coated with a first outer layer covering only a selected portion thereof. The resultant combination could then be pulled through the die 350 and portions of the substrate not covered by the first layer could be coated with a second layer coextensive with the first layer. Thus, as shown in FIG. 9, a low friction strip 395 may be provided directly on a selected portion of the substrate with the remainder of the coated portions of the substrate covered with a layer 385 of different material.

Figure 10:
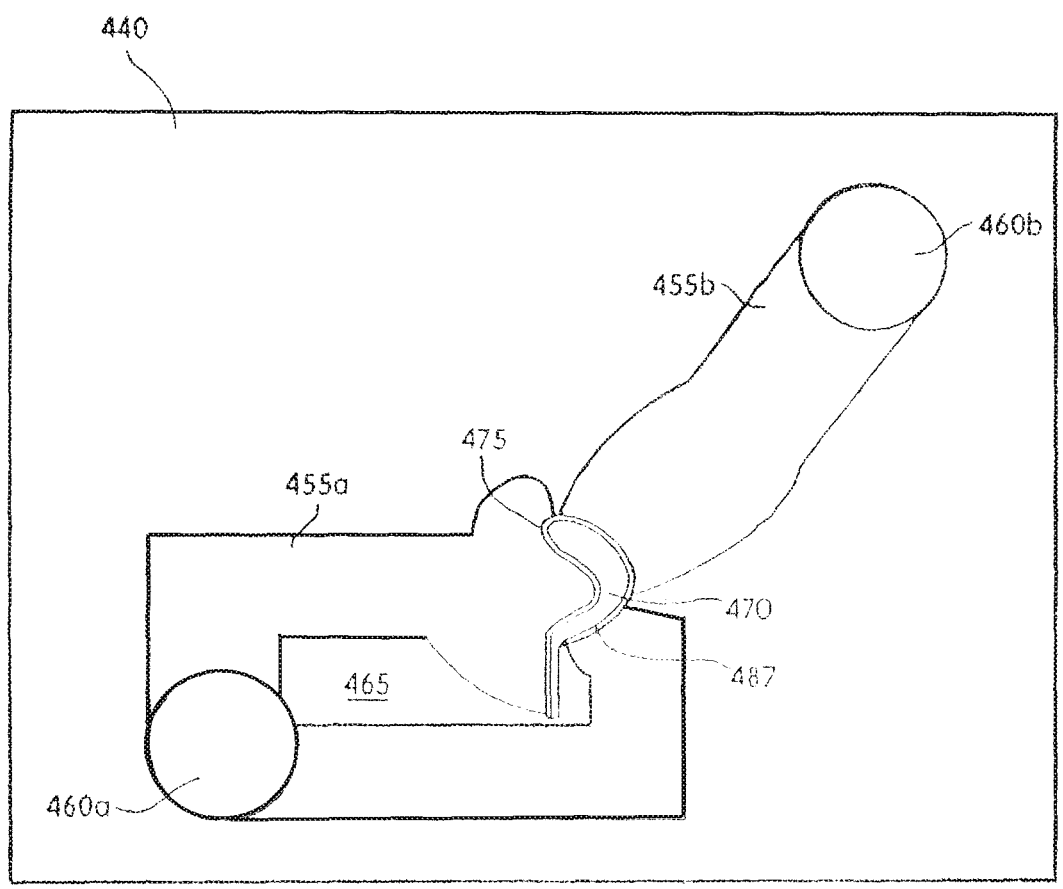
FIG. 10 is a plan view of a die plate in accordance with another embodiment of the coated weatherstrip manufacturing apparatus to produce the weatherseal of FIG. 9.

FIG. 10 illustrates a die plate in accordance with another embodiment of the apparatus for manufacturing coated weatherstrip. A die plate 440 may be utilized to provide a dual extruded skin. The die plate 440 includes resin channels 455a and 455b containing first and second different resins, respectively, for coating a substrate pulled through a die opening 470. The first resin is admitted to the resin channel 455a through an opening 460a and the second resin is admitted to the resin channel 455b through an opening 460b. The resin in the resin channel 455a is divided into two streams by a die portion 465. The resin channels 455a and 455b are formed such that there is no mixture of the first and second resins in the channels. The first and second resins are metered between a wall portion 475 and a face plate (not shown) into a low pressure pocket formed by a ridge 487 from where they are applied to the substrate. The embodiment of FIG. 10 may be used to produce the weatherseal shown in FIG. 9.

One aspect of the weatherstrip produced in accordance with the described methods is that a less oriented skin is produced, i.e., the skin molecules are not aligned to the same degree as they would be in a crosshead extrusion. The low orientation produces a skin which is strong and rubbery. The skin has uniform strength in all directions and does not propagate lengthwise tears. The skin is less oriented since it is not drawn-down onto the substrate as in a typical crosshead die as in other prior art methods and systems.

In addition, a high pressure die, because of the high pressures and the resulting flow rates, requires very careful channeling to ensure that the pressures are balanced. The intricate channeling and the requirement of withstanding high pressures require machining and generally increase production costs. The die used in one embodiment of the described system is utilized in a relatively low pressure system which tends to balance its own pressures and does not require intricate channeling. Low pressure regions in the die of the disclosed apparatus may be easily compensated for by reducing the height or thickness of the wall portions. Dies of this type are easier to make and are significantly less expensive than conventional crosshead dies.

In one example of manufacturing coated weatherstrip, SANTOPRENE having a durometer reading of 64 was foamed in accordance with the method detailed in the aforementioned commonly assigned patents. A stiffener of polypropylene was bonded to the foam profile as shown in FIG. 1. A blend of 750 parts SANTOPRENE 221-64, 250 parts SANTOPRENE 223-50, 50 parts Ampacet, #10061, and 80 parts of a color additive was melted in a 1¼" extruder operated at 95 revolutions per minute and fed into a die of the type shown in FIGS. 2 and 3 with the die at 480° F. The foam-stiffener combination was pulled through the die at 50 feet per minute and subsequently pooled.

In accordance with one embodiment of the present invention, tear-resistant, low-friction, polypropylene fabric or other cover layer may be combined with the compression set resistance of foam and a coating layer or skin to provide a product exhibiting desirable sealing and long life using a cost effective production method of applying the fabric to the foam substrate. Alternatively, a porous fabric, non-woven fabric with or without a film layer, single layer or laminated film, metal mesh, fabric or metal cladding, reinforcing film or fabric, or woven fabric may be utilized as the cover layer. The cover layer may be the fabric/thermoplastic copolymer sold by Xamax Industries, Inc., under the trade name FLOLAM®. Cover layers utilizing a non-woven polypropylene fabric with a polypropylene film or coating applied to one or both sides of the fabric may also be utilized. Such a non-woven polypropylene composite is sold by Xamax Industries, Inc., under the designation Q ECM. Thickness of the fabric cover layer may vary from about less than 1 mil to greater than 5 mil or more, depending on the particular manufacturing process used, application, etc. Additionally, the fabric layer may vary from about 1 oz/sq yd to about 2 oz/sq yd or more, depending on the application. In certain embodiments, the fabric cover layer is coated with a 2 mil polypropylene film, and has a basis weight of 1.25 oz/sq yd. The application of the fabric or cover layer may be incorporated into the systems and methods described above regarding manufacture of coated foam weatherstrip. Additionally, the terms "fabric layer," "cover layer," "fabric cover layer," "cladding," "sheathing," "fabric laminate," etc., are used interchangeably herein and throughout this document, and use of one term or another does not in any way limit the particular type of layer or material that may be utilized in a particular application. In certain embodiments, the coating acts as a tie layer, to permanently bond the fabric layer through combined application of heat and pressure. The fabric layer can be utilized to fully or partially encapsulate the foam core. The fabric may be applied in strips to provide low friction areas, hinges, reinforced areas, chafe resistant areas, or color match areas in order to impart specific characteristics to the product. The fabric layer may also be applied directly to or used in conjunction with substrates other than foam, such as rigid plastic profiles, hollow extruded bulbs, etc. The underlying extruded coating layer of polymer or other material may be used primarily as a bonding material, requiring little or no UV protection or low friction characteristics. Those performance features in the product can be provided by the fabric layer. The coating layer may be a lower cost material to act primarily as a tie layer, depending on the application and product exposure to the environment. The fabric layer may optionally have a secondary extruded layer, extruded onto the edges to protect them from catching and lifting with use, utilizing polyethylene, TPV, TPE, polypropylene, ABS, SEBS, or other suitable and thermally compatible material. Secondary coatings may be extruded onto the surface of the fabric in order to impart further features, such as UV resistance, moisture resistance/water tightness, ultra-low friction coefficients, etc. Additionally, the fabric layer may be coated with a film or adhesive to improve bonding properties with the coating. Alternatively, the fabric layer can be attached to the foam or other portion of the substrate solely by the secondary layer at solely the edges, or partially or fully along the cross-sectional extent. Exemplary embodiments of weatherstrip manufactured in accordance with the present invention are depicted in FIGS. 16A-16L, though other configurations are clearly contemplated and within the scope of the invention.

Figure 11:
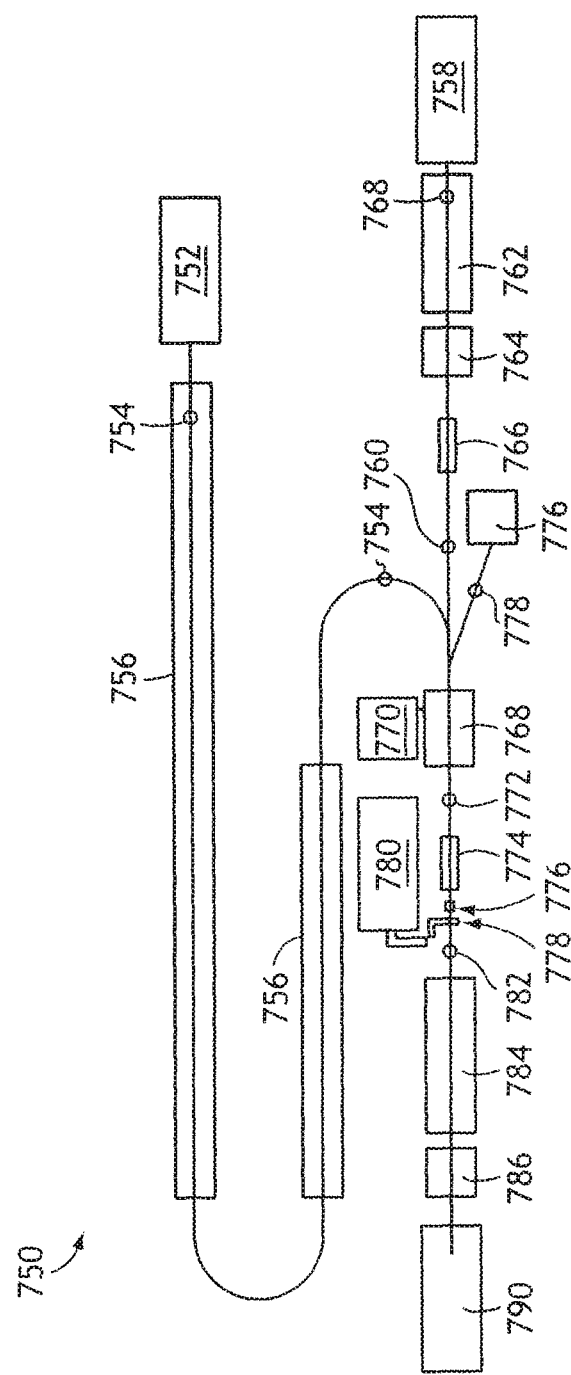
FIG. 11 is a schematic representation of a manufacturing apparatus in accordance with one embodiment of present invention.
Figure 12:
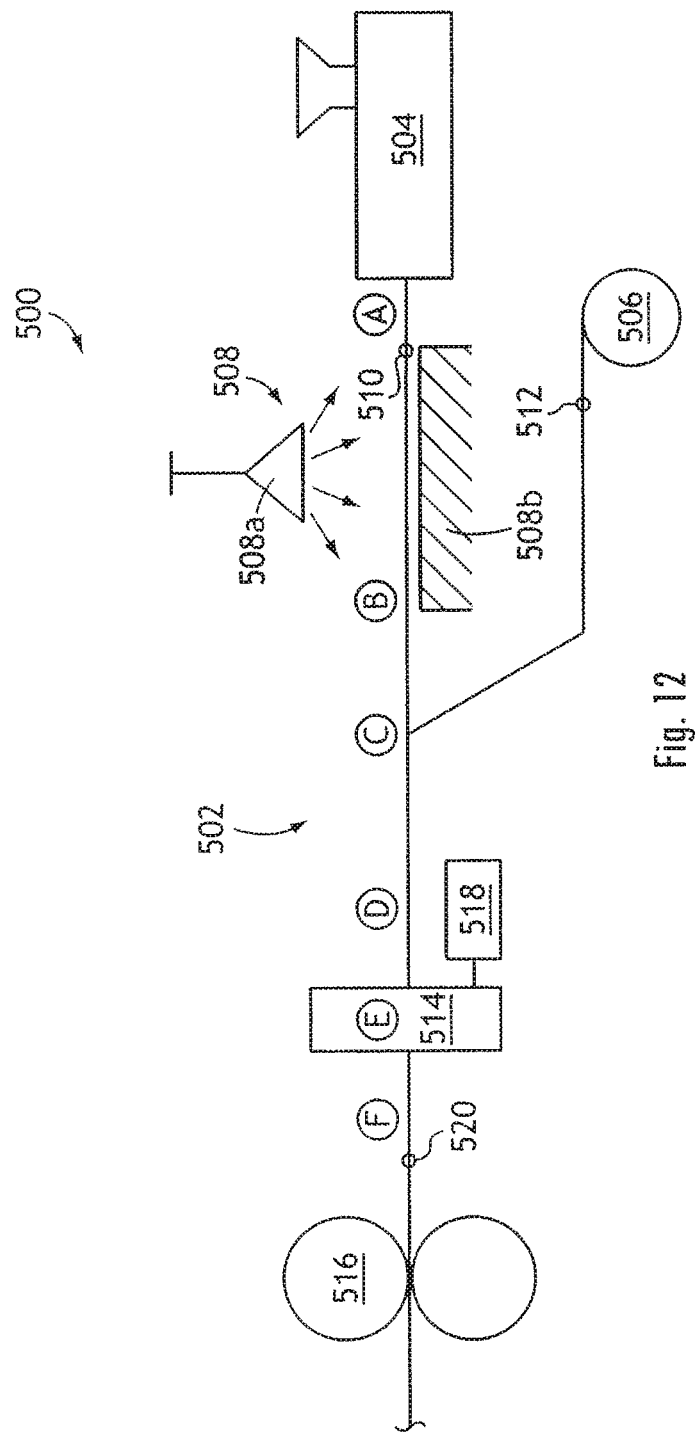
FIG. 12 is a schematic representation of a manufacturing apparatus in accordance with another embodiment of the present invention.

Various embodiments of the invention are contemplated. One embodiment of a process line 750 for manufacturing fabric clad weatherstrip is depicted in FIG. 11. This figure is described in more detail below. FIG. 12 depicts a clad weatherstrip manufacturing apparatus 500; letters at various points along the process line 502 indicate points where the fabric strip may be applied to the foam profile (A, B), foam profile/stiffener combination (C, D, E), or coated foam profile/stiffener combination (F). The process line 502 is similar to that of FIG. 1 and generally includes a reel of foam profile or a foam profile extruder 504, a reel 506 of stiffener or a stiffener extruder, and an optional heat generating device 508 (e.g., a hot air blower 508a or hot plate 508b). The foam profile 510 and stiffener 512 are bonded or adhered together and drawn through a coating die 514 by a puller 516. The coating die 514 may be supplied with molten resin by a separate extruder 518. The coated foam profile/fabric/stiffener combination 520 is then rolled or otherwise processed for storage, distribution, etc. Application of the fabric strip at the various points are described with reference to FIGS. 13A-13F.

FIG. 13A depicts an embodiment of an apparatus 530 that secures the fabric 532 to the foam profile 510 a distance downstream of the extruder 504 after the profile 510 has expanded to substantially its final shape. The fabric 532 is applied to the profile 510 from a fabric roll 534 utilizing a contoured pressure roller 536 in combination with a contoured pressure plate 538 or other roller of the appropriate geometry. The heat generated by the newly extruded foam profile 510 may aid in adhering the fabric 532 to the profile 510. Downstream of the pressure roller 536, a stiffener (not shown) is applied to the fabric/foam combination 542.

FIG. 13B depicts another embodiment of an apparatus 550 that secures the fabric 532 to the foam profile 510 during a supplemental heat stage. An optional heat plate 508b, hot air blower 508a, corona, or other thermal apparatus may be used to heat the extruded or unreeled foam profile 510 to provide better adhesion of the fabric 532. Similar to the embodiment depicted in FIG. 13A, a contoured pressure roller 552 is used in combination with a support plate 554 or roller of the appropriate geometry to adhere the fabric 532 to the profile 510. Alternatively, the hot plate 508b may be used in place of the support plate 554 or roller. Downstream of the pressure roller 552, a stiffener (not shown) is applied to the fabric/foam combination 542.

FIG. 13C depicts an embodiment of a fabric application apparatus 560 wherein the fabric 532 and stiffener 512 are applied to the foam profile 510 substantially simultaneously on the process line. Two opposing contoured pressure rollers 562a, 562b may be utilized to apply the two components to the profile 510. This application method may be utilized for profiles 510 that have a stiffener 512 secured on a side directly or generally opposite the fabric 532. The resulting foam profile/fabric/stiffener combination 564 can then be passed through the coating die.

FIG. 13D depicts an embodiment of a fabric application apparatus 570, wherein the fabric 532 is applied to the foam profile downstream from the stiffener application. Similar to the embodiment depicted in FIG. 13A, a contoured pressure roller 572 is used in combination with a support plate 574 or roller of the appropriate geometry to adhere the fabric 532 to the profile/stiffener combination 576. The resulting foam profile/fabric/stiffener combination 564 can then be passed through the coating die.

FIG. 13E depicts another embodiment of a fabric application apparatus 580, wherein a fabric applicator die or plate 582 is utilized upstream of the coating die 514 to apply the fabric 532 to the foam profile/stiffener combination 584. The fabric applicator plate 582 may be secured or bolted 594 to the coating die 514 with or without a thermal break 586, which may be air, non-heat conductive material, or otherwise. A shaped opening 588 in the plate 582 allows the fabric 532 to be formed properly to secure the fabric 532 to the foam/stiffener combination 584. Optionally, a guide 590 may be used to ensure proper forming of the fabric 532 around the foam/stiffener combination 584. After passing through the fabric applicator plate 582, the fabric/foam/stiffener combination 590 passes through the coating die 514, where the exterior layer or skin is applied via the resin channel 592, as described with regard to the manufacture of coated weatherstrip. The coated foam profile/fabric/stiffener combination 520 is then rolled or otherwise processed for storage, distribution, etc. Other embodiments of fixtures or guides that may be used in place of the fabric applicator plate 582 are described herein.

FIG. 13F depicts another embodiment of a fabric application apparatus 600 wherein the fabric 532 is applied to the coated foam profile 602 downstream from the coating die 514. Similar to the embodiments depicted in FIGS. 13A, 13B, and 13D, a contoured pressure roller 604, is used in combination with a support plate 606 or roller of the appropriate geometry to adhere the fabric 532 to the coated profile 602. In this embodiment, the fabric 532 contacts the freshly coated surface and attaches to the coating layer immediately downstream of the coating die 514, while the coating is still in the molten state. The coated foam profile/fabric/stiffener combination 520 is then rolled or otherwise processed for storage, distribution, etc.

Figure 14:
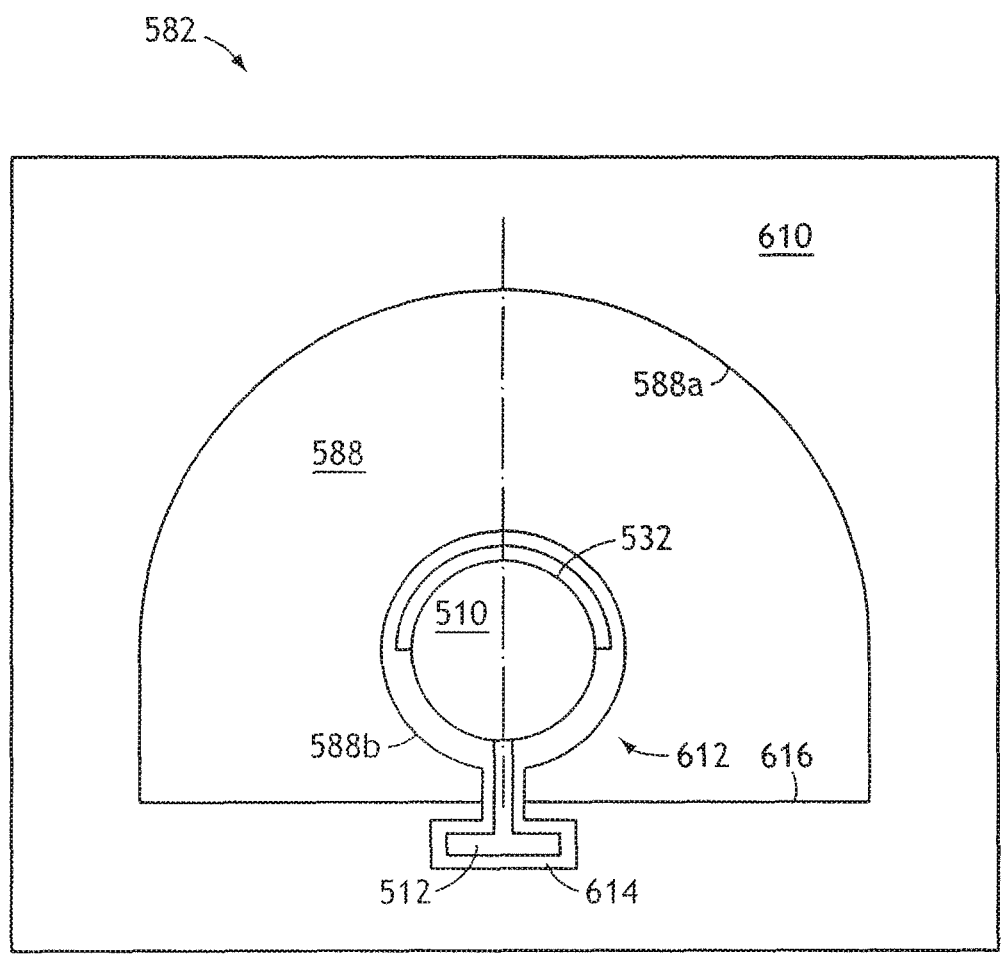
FIG. 14 is a schematic end view of one embodiment of the fabric applicator die of FIG. 13E.

FIG. 14 is an end view of one embodiment of the fabric application plate 582 depicted in FIG. 13E. The plate body 610 defines a tapered, generally conical channel 588; however, different shapes are contemplated, depending on the geometry of the profile 510 and desired finished weatherstrip product requirements. Additionally, a recess 614 may be formed in a lower portion of the plate 582 to accommodate all or a portion of the stiffener 512. In the depicted embodiment, a bottom opening 616 of the die 582 retains the foam/stiffener combination 612 as the channel 588 tapers from an oversized profile 588a to a point 588b where the channel 588 is approximately the same size as the foam/stiffener combination 612. As the fabric 532 follows the taper of the channel 588, it is gradually formed until it achieves the desired shape and proximity to the profile 510, at which time it may be adhered to the foam profile 510. The channel 588 is sized to accommodate both the fabric 532 and the foam profile 510, with sufficient, gradual curvature to properly form the fabric 532 so it may be conformed to the foam profile 510 without undesired creasing. At the point 588b where the fabric 532 meets the foam/stiffener combination 612, the channel 588 is sized and configured approximately the same as the die opening in the resin channel 592 through which the foam/stiffener/fabric combination 590 passes in the coat die 514 downstream. As the fabric 532 contacts the foam profile 510, it presses against the profile 510 as it is passed through the coating die 514.

Additional fixtures and/or guides may be utilized either upstream or downstream of the coating die 514 to guide or direct the fabric layer into the desired position, orientation, and/or contour on the foam profile. For example, FIGS. 15A-15C show several embodiments of fabric application stations 620a, 620b, 620c for applying a fabric 532 to a profile 510 at the entrance of a coating die 514. Additionally, these fabric guides may be used for applying a fabric to a profile downstream of the coating die 582. The fabric guide 622a, 622b, 622c may be secured to the coating die 582, with or without a thermal break, or to any other proximate structure. Additionally, tapered or funnel-shaped guides are contemplated to gradually form the fabric to the shape required for the particular application. The guide can be mounted to the coating die in the proper orientation and can include a channel or recess to receive the fabric and orient the fabric to apply it at the proper location on the profile.

In the depicted embodiments, the fabric application stations 620a, 620b, 620c include a fabric guide 622a, 622b, 622c that may be attached directly to the coating die 582. Alternatively, the fabric guide 622a, 622b, 622c may be independent of the coating die 582. In FIG. 15A, one embodiment of the fabric guide 622a is depicted that includes a rod 624a or bar that spans a pair of armatures 626a forming an opening through which the fabric 532 can pass. The fabric 532 is routed between the armatures 626a and guided by the bar 624a, which may be grooved or shaped to contour the fabric 532 to a desired configuration. Another fabric guide 622b is depicted in FIG. 15B. In this embodiment, a guide plate 624b is utilized to conform the fabric 532 to a desired shape prior to passing the fabric 532 and foam/stiffener combination 576 through the coating die 582. The plate 624b may have an opening similar to that depicted in FIG. 14. Alternatively, the opening may utilize a different taper or radius of curvature to shape the fabric, as required.

FIG. 15C depicts a fabric guide 622c having multiple rods or bars 624c that allow the approach angle α of the fabric to the foam/stiffener combination 576 to be adjusted, as required for a particular application. Additionally, the fabric roll (not shown) may be positioned such that an initial approach angle of the fabric 532 relative to the foam/stiffener combination 576 (i.e., the fabric angle θ) may be adjusted as needed to provide sufficient clearance depending on the application, fabric qualities, etc. Approach angles α between greater than 0° and less than about 90° are contemplated. For foam profiles having a generally flat top surface, the approach angle α may be larger than those used for contoured profiles. In one embodiment for a round profile, the approach angle α and the fabric angle θ are substantially the same, and in a range of less than about 45°. The guide 622c functions to conform the fabric 532 to the shape of the profile/stiffener combination 576. Such a configuration allows the guide to merely shape the fabric, without significantly redirecting the fabric 532 from the fabric angle θ to the approach angle α, as a large deviation between those two angles increases friction and may cause undesired creasing or breakage of the fabric 532. In one embodiment, this angle, α', is less than about 10° from the foam/stiffener combination. In other embodiments, the angle α' may be less than about 5°. This angle may be maintained for distances up to and above about 5 feet to about 10 feet upstream of the fabric guide, to ensure a smooth transition of the fabric onto the foam/stiffener combination. In certain embodiments, the angle is maintained for distances of about 6 feet to about 8 feet upstream of the coating die. In other embodiments, the approach angle γ maintained for several inches upstream of the coating die.

FIGS. 16A-16L schematically depict cross-sections of various embodiments of fabric-clad foam weatherstrip 630 manufactured in accordance with the present invention. Embodiments of weatherstrip made in accordance with the invention may include stiffeners and foam profiles of virtually any configuration. For example, generally linear and T-shaped stiffeners are depicted in FIGS. 16A-16L, but other shapes, with or without retention barbs are contemplated. Similarly, cross sections of foam profiles may be of any shape, including square, circular, L-shaped, trapezoidal, oval, triangular, etc. Additionally, hollow foam profiles may be used, as well as non-foam profiles. FIGS. 16A-16L are schematic depictions; thus, the sizes, thicknesses, etc. of the various elements are not to scale. Further, it should be understood that the various depicted elements are generally shown spaced apart for clarity; however, unless otherwise described, the elements are in mating contact.

Figure 16A:
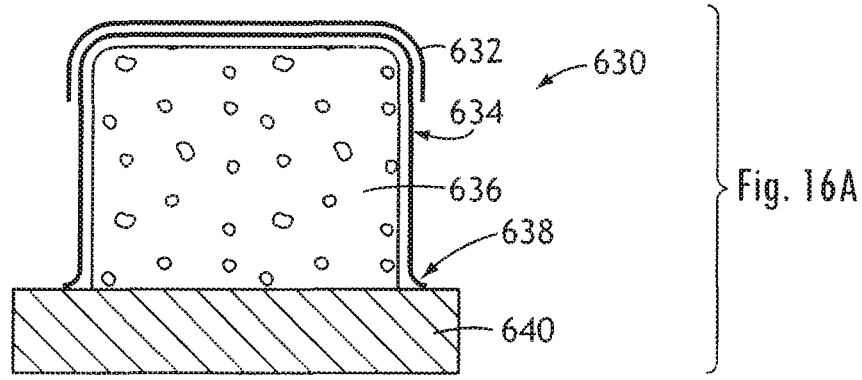
FIGS. 16A-16L are schematic sectional views of various embodiments of fabric-clad foam weatherstrips in accordance with certain embodiments of the present invention.
Figure 16B:
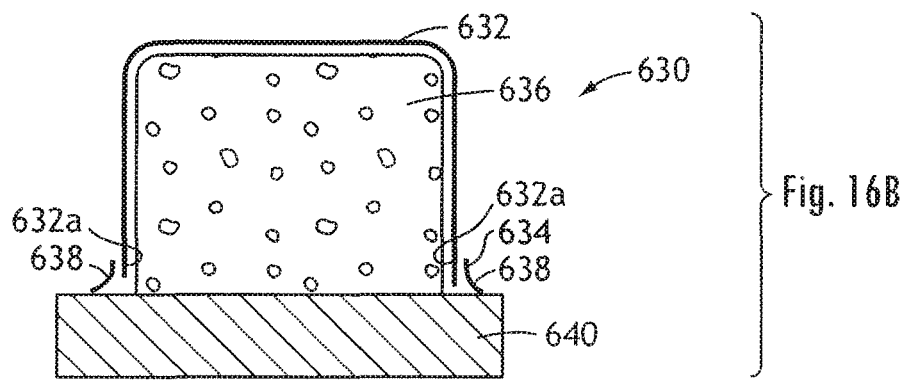
Figure 16C:
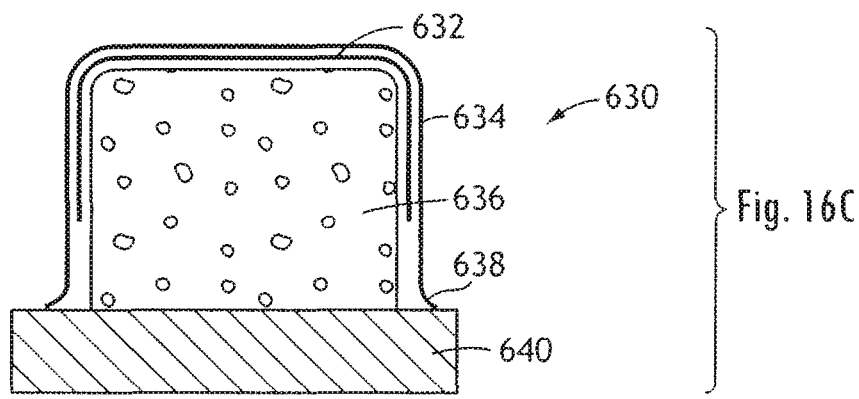
Figure 16D:
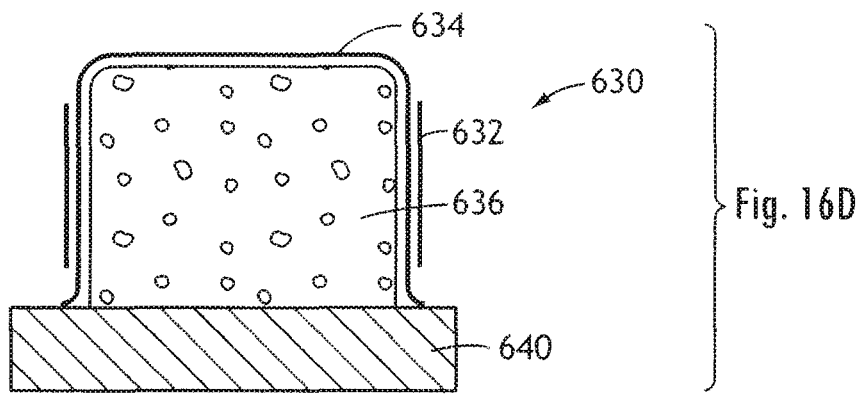

FIG. 16A depicts a weatherstrip 630 wherein the fabric layer 632 only partially covers the coating 634 and the foam profile 636. The coating 634 includes portions 638 that overlap at least a portion of the stiffener 640 to provide additional attachment of the profile 636 to the stiffener 640. FIG. 16B depicts a fabric layer 632 completely covering the exposed foam profile 636. The edges 632a of the fabric 632 are covered by discrete portions 638 of the coating layer 634 to anchor the fabric 632 and prevents the fabric edges 632a from releasing from the profile 636. FIG. 16C depicts a fabric layer 632 completely covered by the coating 634 of the weatherstrip 630. FIG. 16D depicts fabric 632 located solely on the sides of the weatherstrip 630, above the coating 634, providing reinforcement.

Figure 16E:
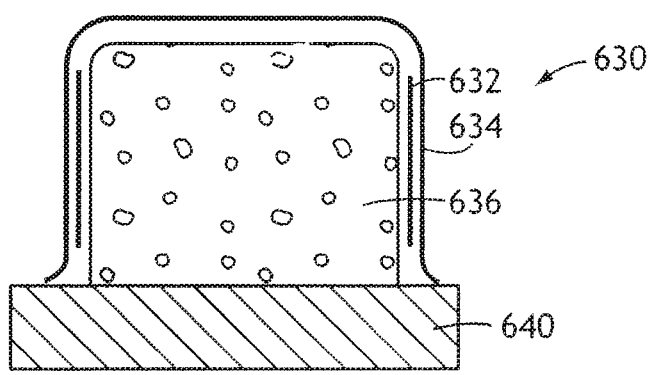
Figure 16F:
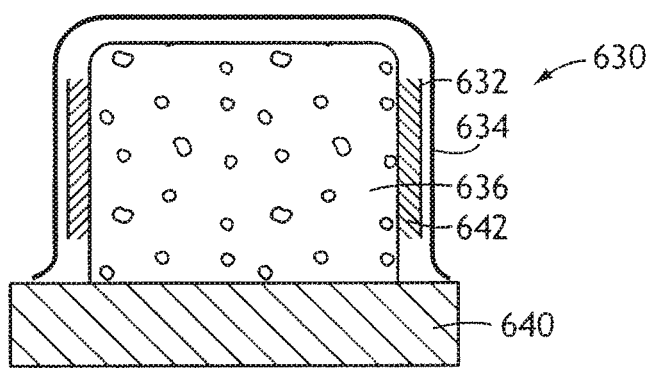
Figure 16G:
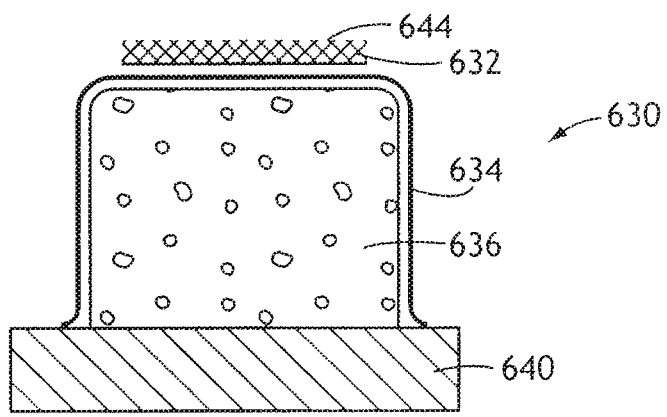
Figure 16H:
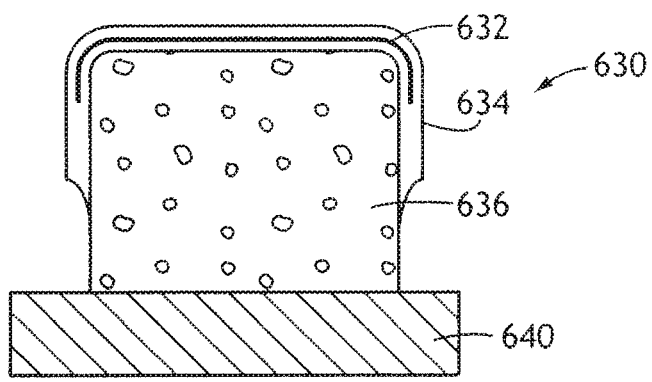

FIG. 16E depicts fabric 632 located on the sides of the weatherstrip 630 and below the coating 634. In this embodiment, the fabric 632 provides reinforcement even in the absence of bonding of the foam profile 636 to the fabric 632. FIG. 16F depicts a weatherstrip 630 similar to that depicted in FIG. 16E, but including an adhesive layer 642 adhering the fabric 632 to the foam profile 636. FIG. 16G depicts an embodiment of weatherstrip 630 having fabric 632 located above the coating 632, similar to that depicted in FIG. 16A. The fabric 632 can be mechanically treated with an abrasive (e.g., a wire wheel) to scuff the fabric 632. The scuffed surface 644 of fabric 632 may provide increased cushioning, sealing thickness, an improved seal against irregular surfaces, and may further reduce friction. FIG. 16H depicts a weatherstrip 630 utilizing the coating 634 to hold the fabric 632 against the foam profile 636, without completely surrounding the foam profile 636. The fabric 632 may still be utilized on a portion of the foam profile 636, with or without the use of adhesive.

Figure 16I:
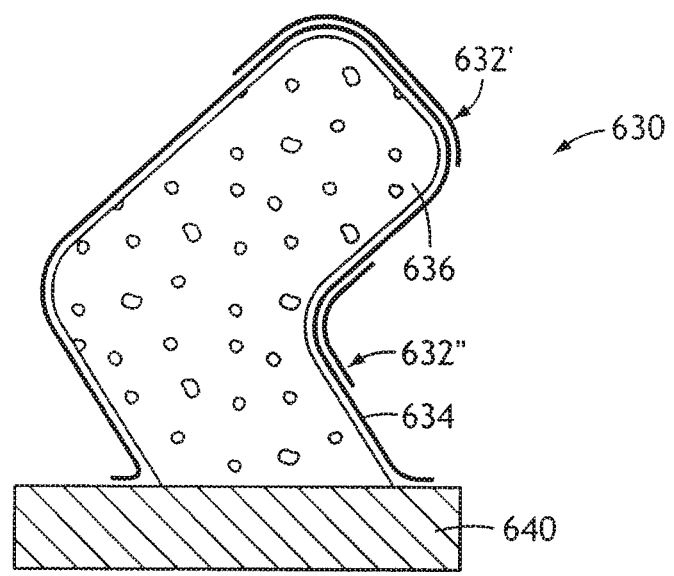
Figure 16J:
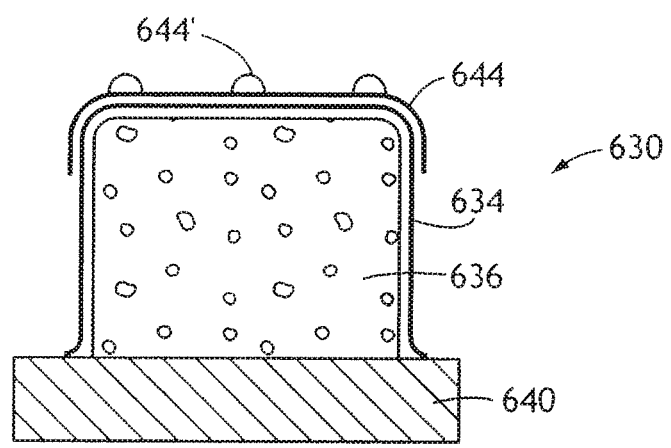

FIG. 16I depicts an embodiment of weatherstrip 630 having an irregular shape with fabric 632', 632" in two different locations. The fabric 632' located on the outer top curvature of the profile 636 prevents tearing of the profile 636 and reduces friction. The fabric 632" on the inside corner of the profile 636 may act as a hinge, whether supported along its width by the skin 634, or free-floating. FIG. 16J depicts an embodiment of the weatherstrip 630 utilizing a ribbed or striated fabric 644, which may provide additional sealing against irregular surfaces, friction resistance, etc. The ribs 644' may be formed in the fabric 644; alternatively, ribs of low friction coating can be applied to spaced locations on the fabric.

Figure 16K:
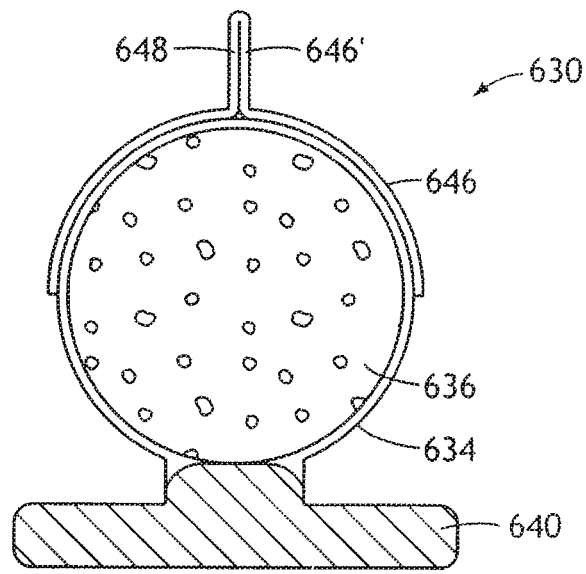
Figure 16L:
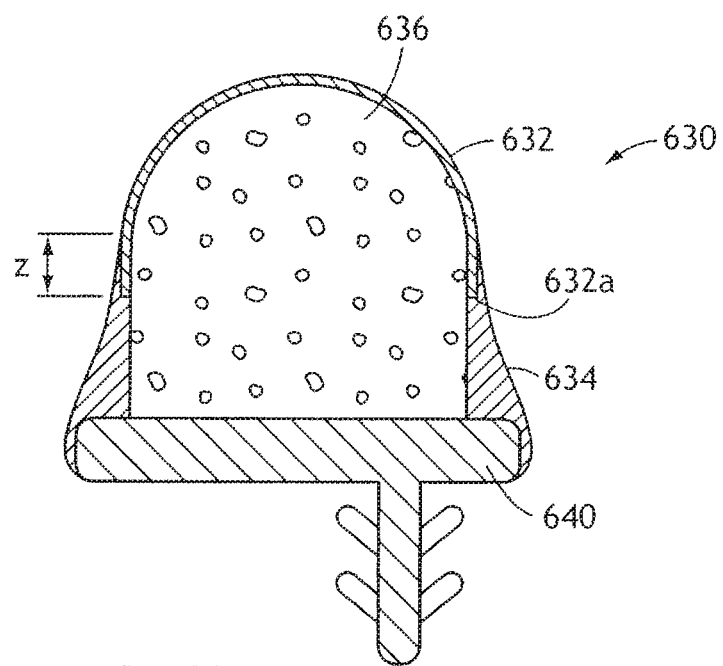

FIG. 16K depicts an embodiment of the weatherstrip 630 wherein a pleat 646' is present in the fabric 646 create a sealing wand 648. Alternatively or additionally, materials may also be extruded onto the fabric layer to create sealing wands or fins. FIG. 16L depicts another embodiment of the weatherstrip 630, where the coating layer 634 partially overlaps the edges 632a of the fabric 632. In this embodiment, and in other embodiments where the coating does not completely cover the fabric, the coating layer may overlap the fabric layer at its edges as desired for a particular application. Manufacturing tolerances may dictate the minimum required overlap, z, but overlaps of about 0.03 in. to about 0.06 in. are typical. Larger overlaps may be desired for applications that require more robust adhesion of the fabric or where shear loading of the fabric is experienced in use, but where complete overlap of the fabric is not required. In certain embodiments overlaps of up to about 0.2 in. are utilized.

Figure 17:
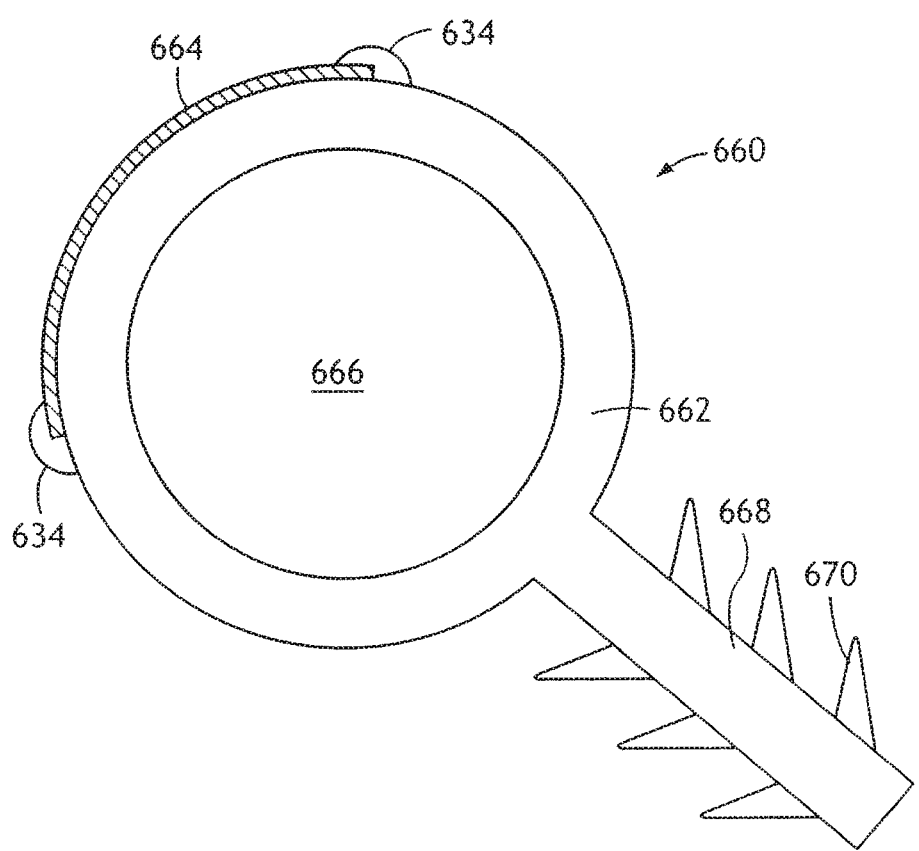
FIG. 17 is a schematic sectional view of a fabric-clad extruded hollow bulb seal in accordance with an embodiment of the present invention.

Other types of seals 660 can benefit from application of a fabric layer, as depicted in FIG. 17. For example, silicone or rubber profiles 662 (either solid or hollow) can have a fabric layer 664 applied thereto, as depicted in FIG. 17. The core void 666 of the depicted hollow profile 662, can be pressurized or supported on a mandrel when the fabric layer 664 is applied to provide support, if desired. Additionally, the fabric cover layer may be applied to all or part of the outer surface of the bulb and/or stiffener, utilizing many of the same processes described herein for manufacturing foam weatherstrip, modified as needed for hollow extruded bulb applications. The fabric layer may almost entirely surround the profile 662, and may be secured only at the stiffener 668. Generally, the barbs 670 in such an embodiment remain exposed in the finished weatherstrip. The coating layer 634 can be applied over, under, or solely along the edges of the fabric layer 664

Figure 18A:
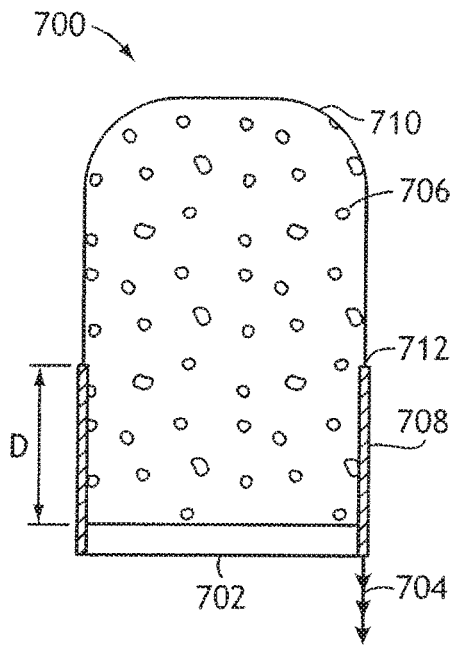
FIGS. 18A-18D are schematic sectional views of a fabric-clad weatherstrip manufactured in accordance with alternative embodiments of the present invention.

In instances where the fabric layer is only bonded to the profile at the edges, and/or where the coating layer does not fully encapsulate the foam profile, weatherstrip performance properties can be improved. FIGS. 18A-18B depict an example of a weatherstrip 700 made in accordance with the present invention. The weatherstrip 700 includes a stiffener 702 having a barbed extension 704. A foam profile 706 is secured to the stiffener 702 along its base. A coating layer 708 is applied to and extends a distance D along the sides of the profile 706. A fabric layer 710 covers the profile 706, and is secured only at its edges 712 by the coating layer 708. FIG. 18A shows the weatherstrip 700 in a neutral or unstressed position. When a force F is applied to the top of the weatherstrip 700, as depicted in FIG. 18B, the weatherstrip 700 is deformed. This deformation may occur as a result of a window or door closing against the weatherstrip 700. As the weatherstrip 700 deforms, the foam profile 706 is compressed (outline 714 shows the shape of the weatherstrip 700 prior to the application of force F). As the foam profile 706 compresses, the fabric layer 710 separates from the profile 706, forming gaps 716 between the profile 706 and the fabric 710. In foam profiles, these gaps 716 expose an internal surface area of the profile 706 (essentially along the entire length of the weatherstrip 700), that allows for improved air movement in the weatherstrip 700, enabling faster compression at lower resistance and correspondingly faster recovery when the force F is removed. This feature provides for enhanced performance and sealing effectiveness. In embodiments of the weatherstrip 700 configured as depicted, the profile 706 may deflect significantly, without corresponding deformation in the coating 708. Some minimal spread S of the profile 706 to the sides of the weatherstrip 700 may occur, but it is generally limited to a range that does not causes excessive wear on the weatherstrip 700 or individual elements.

Figure 18C:
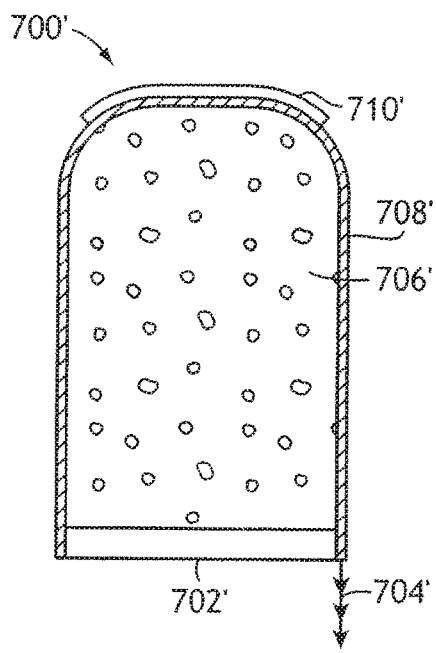
Figure 18B:
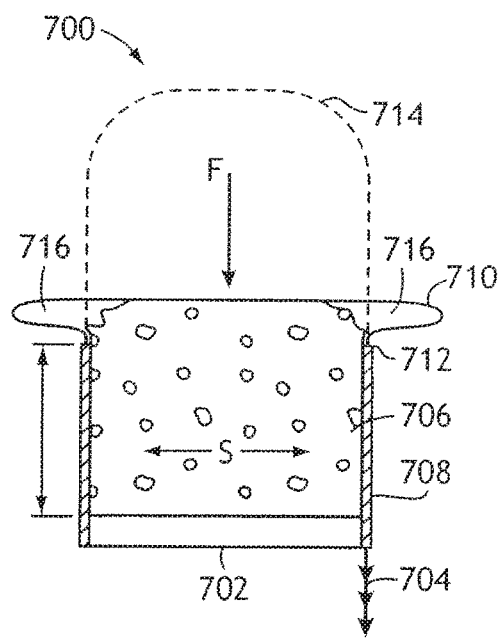
Figure 18D:
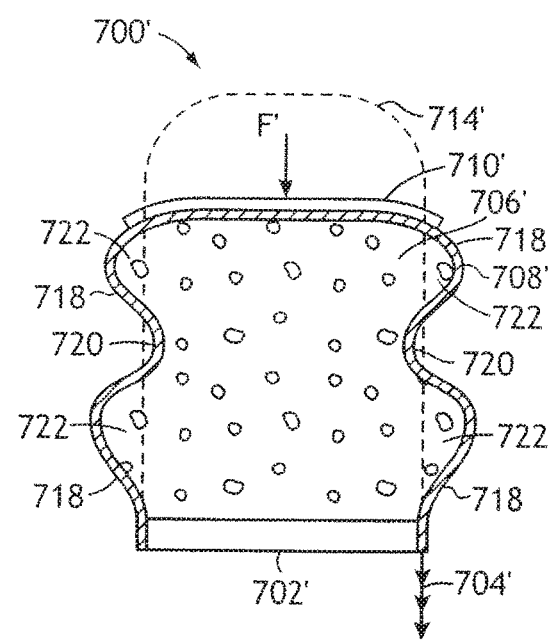

FIGS. 18C-18D depict another weatherstrip 700', having a stiffener 702' with a barbed extension 704' produced in accordance with another embodiment of the invention. The foam profile 706' is fully coated by the coating layer 708' with a fabric layer 710' on top. As depicted, weatherstrip 700' is dimensionally similar to weatherstrip 700 when in the neutral position. Application of force F' against the weatherstrip 700' is depicted in FIG. 18D. As the force F' is applied, the weatherstrip 700' deforms along its length. As the weatherstrip 700' deforms, the foam profile 706' is compressed (outline 714' shows the shape of the weatherstrip 700' prior to the application of force F'). Unlike the weatherstrip 700 utilizing an unadhered fabric layer 710, the coating 708' cannot separate from the deforming foam profile 706'. Depending on the thickness and stiffness of the coating 708', bulges 718 can form on the outer surface of the weatherstrip 700'.

As known to those of ordinary skill in the art, compression load deflection (CLD) curves are important in determining suitability of foam weatherseals in fenestration applications. As depicted, the weatherstrip 700 of FIG. 18B typically can be compressed further than the weatherstrip 700' of FIG. 18D, under a similar load. This improved compression load deflection performance is, therefore, highly desirable in applications such as window and door seal applications. Further, compression set and compression force can be reduced, because the foam can compress free of any surface constraints caused by a continuous surface layer of coating or fabric. Weatherstrip drag or friction can also be reduced, since the fabric layer can shift or move relative to the underlying foam profile. Sealing can also be improved, since the fabric layer can have a tendency to widen and flatten, when the foam profile is compressed. Sealing application that require more robust sealing, however, nonetheless can benefit from the fully encapsulated and attached foam profile.

The process of applying fabric to the inside or outside of the skin or coating layer of a weatherstrip utilizes any of the coated weatherstrip manufacturing processes described above. The manufacturing process may include a series of thermoplastic resin extruders laid out in a sequential pattern, so as to optimize the efficiency of applying sequential components and layers of polymeric material to the product. Thermal bonding may be used advantageously in order to join the components together to produce a complex weatherstrip structure in cross sectional profile, but with an infinite length. The extruder locations can be configured to optimize the ability of a single operator to see and monitor the controls, speeds, and output of the entire line, and to make adjustments according to product and process requirements. The foam profile production process rate is controlled by the conveyor speed, the stiffener rate by the first puller speed, and the coated combined product by the second puller speed, thus balancing the system so that the output from each extruder is matched with the line's output speed. This is accomplished by a combination of tension, loop control, and extruder output. In the alternative, foam and/or stiffener components can be pre-extruded and stored on reels or bins and fed into the coat die, increasing material handling and storage, but reducing size of the floor layout for the production line.

Settings for one embodiment of a weatherstrip manufacturing apparatus (such as an embodiment of the apparatus depicted in FIG. 1) are depicted in Table A, below. This exemplary process line utilizes extruders for the foam profile, stiffener (which may be co-extruded with barbs), and weatherstrip coating or skin. One advantage of the process disclosed herein is that the fabric application may occur without significant modifications to the process line settings, allowing for an efficient and cost effective change-over in production of coated weatherstrip to the fabric-reinforced weatherstrip disclosed herein. In the Table, the Additive Feeder and Extruder Speeds are dial settings. The screens are utilized in the extrusion process. Dual screen systems are used for various sizes (e.g., 14 openings/in, and 40 openings/in.).

TABLE A

Process Line Settings

| FOAM EXTRUDER | BARB EXTRUDER |
|---|---|
| Additive Feeder: 200 | |
| Profile: | Profile: |
| Zone 1: 300° F. | Zone 1: 390° F. |
| Zone 2: 330° F. | Zone 2: 440° F. |
| Zone 3: 350° F. | Zone 3: 440° F. |
| Zone 4: 350° F. | Adapter: 450° F. |
| Zone 5: 350° F. | Die I: 450° F. |
| Zone 6: 350° F. | |
| Zone 7: 345° F. | |
| Zone 8: 340° F. | |
| Clamp: 365° F. | |
| Die: 365° F. | |
| Water Injection: 3.8 ml/min; | Extruder Speed: 440; Screens: 14/40 |
| Extruder Speed: 275; | |
| Conveyer Speed: 60 ft/min; | |
| Screens: 14/40 | |

| STIFFENER EXTRUDER | COATING EXTRUDER |
|---|---|
| Profile: | Profile: |
| Zone 1: 390° F. | Zone 1: 350° F. |
| Zone 2: 440° F. | Zone 2: 400° F. |
| Zone 3: 440° F. | Zone 3: 445° F. |
| Die 1: 450° F. | Die 1: 445° F. |
| Die 2: 450° F. | Die 2: 440° F. |
| | Die 3: 445° F. |
| Extruder Speed: 1000; Puller Speed: 60.4 ft/min; Screens 14/40 | Extruder Speed: 815; Puller Speed 60.6 ft/min; Screens 14/40 |

The layout of the stiffener die is generally in-line with the coating die and hot-melt adhesive applicator, with the foam being carried into the path of the stiffener from a right-angle approach. Likewise, the direction of resin flow supplying the coat die is at about a 90-degree angle from the stiffener, but other arrangements are also contemplated. For an efficient use of floor space, the coating resin extruder can be placed parallel with the stiffener extruder with an elongated adaptor with an "S" channel situated therein, allowing, on the inlet end, a means of attaching the adaptor to the face of the coat extruder exit face plate by mounting screws set in a circular fashion. In one embodiment, a pipe fitting is attached at the die end of the "S" channel which is in turn attached to the inlet of the coat die. By the use of this offset adaptor plate, the coat die is mounted offset to the coat extruder, conserving floor space and allowing a single operator to run the line. This also allows the foam conveyor, which is required to gradually cool the foam to nearly ambient surface temperature, to extend parallel to, but behind, the coat extruder, giving the operator good visibility and control over the foaming process. The offset adaptor plate positions the coating resin extruder away from the location where the fabric is applied, whether it is at the foam conveyor, before the coating die, or after the coating die. The offset adaptor plate can be further adapted to accommodate any changes that may be required to make room for the addition of guides, rollers, heaters, or the like for application of the fabric.

In certain applications, foam is reeled under predetermined tension and orientation, and unwound from the reel and combined with polyethylene film utilizing guidance and tension control methods. In these applications, guidance and tension control can be used to more effectively feed the release liner film onto the product downstream of the coat die. Alternatively, foam and finished product is wound onto reels in a controlled manner, stored, and sold for use as finished product. The replacement of a standard mechanical "dancer arm" method of driving the rotary motion of a reel-up machine with the an ultrasonic pulse generator to sense the slack loop required to maintain proper reel-up tension control helps prevent damage to the foam products.

Additionally, a preheating or corona treatment stage may be used on one or more substrates involved in the application of the fabric. Warming plates, beat tunnels, hot air guns, and heat lamps may be used to preheat adhesive backed film, foam, and stiffener material to enhance the bond between components of weatherstripping or other coated products. Further steps of applying heated air to the stiffener in order to dry and preheat the product to enhance the thermal adhesion may also be utilized. Corona treatment of film, stiffener, and foam with Corotec corona discharge units may enhance the adhesion properties as well. For fabric layers that are treated with an adhesive coating, a preheating station of the types described may be utilized prior to applying the fabric layer to the foam profile or stiffener, to ensure a satisfactory bond. Alternatively, the heat generated by the coating die itself or the extruded foam or stiffener may help secure the fabric, depending on the thermal properties of the adhesive used.

The shape of the extruded stiffener may also be controlled by utilizing a single brass block with the shape of the product cut along the length of the upper surface. This block may be fitted into a holder attached to a vacuum apparatus to produce stiffener profiles more precisely than have previously been achieved. A series of slots may be cut by wire EDM in the sizer block so as to hold the product lightly against the upper surface of the block as it is pulled along its length. By controlling the vacuum, the cooling of the molten stiffener may be accelerated while at the same time being supported by the brass block, thereby creating a superior product shape control process.

One embodiment of a process line 750 for manufacturing fabric clad weatherstrip is depicted in FIG. 11. A foam extruder 752 extrudes the foam profile 754 using water as a blowing agent onto one or more conveyers 756 where it obtains its final shape as it cools. A stiffener extruder 758 extrudes the stiffener 760, which is cooled in a water bath 762, white being pulled by a puller 764. Alternatively, an integral stiffener/barb element may be manufactured utilizing a coextruder. An optional heating/drying station 766 may be utilized to treat the extruded stiffener 760, depending on the size or shape of the stiffener (e.g., large extrusions may require one or more drying stations). The foam 754 and stiffener 760 are joined at a glue table 768, which is fed by a glue machine 770. This combination foam/stiffener element 772 may be passed through another heating/drying station 774, if desired.

A fabric spool 776 dispenses fabric 778 along the distance traveled by the combination foam/stiffener element 772. The fabric 778 is not attached to the combination foam/stiffener element 772 at the glue table 768, but passes generally above the table 768. As described with regard to FIG. 15C, a small approach angle α; accordingly, the fabric 778 travels near to parallel to the combination foam/stiffener element 772 until it reaches the fabric guide 776. After forming to the shape of the combination foam/stiffener element 772, the uncoated weatherstrip passes through the coating die 778, which is fed by the coating extruder 780. The finished coated weatherstrip 782 passes through a water bath 784 to cool. An end puller 786 pulls the finished weatherstrip to a reel or cut-up station 790 for final processing.

Figure 19:
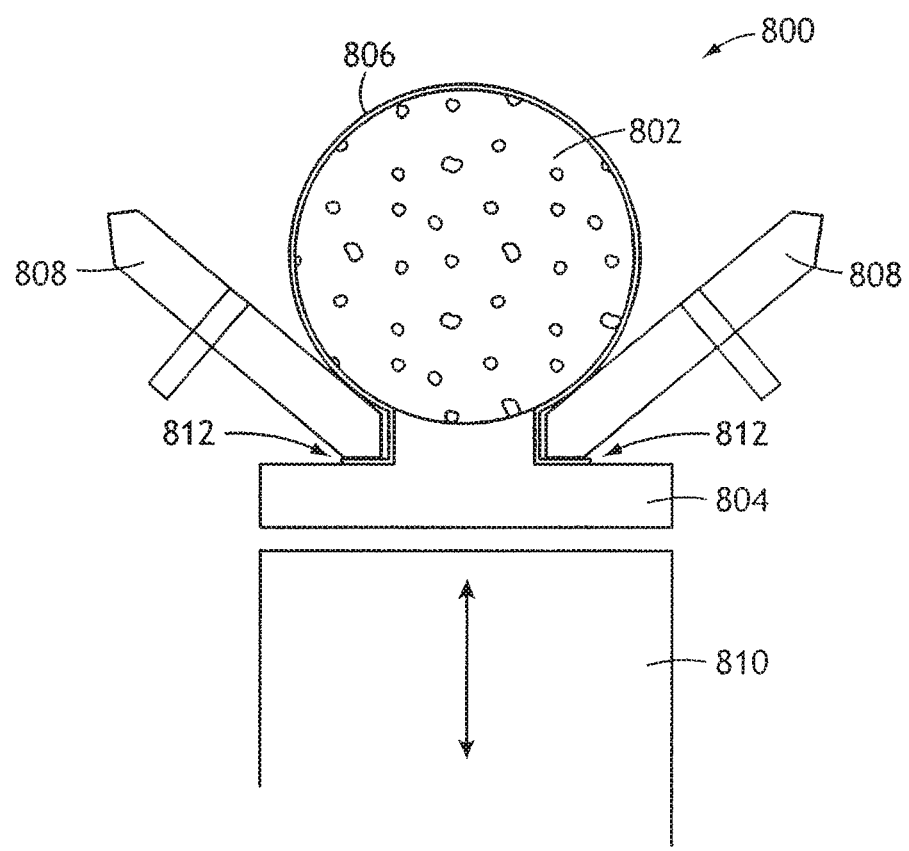
FIG. 19 is a schematic sectional view of an embodiment of a fabric-clad foam weatherstrip manufactured utilizing ultrasonic welding.

Fabric clad foam weatherstrip may also be manufactured using ultrasonic welding in lieu of, or in addition to, the resin coating application. One such ultrasonic welding station 800 is depicted in FIG. 19. In this embodiment, the foam profile 802 and stiffener 804 have been joined and the fabric cover layer 806 applied to the foam profile/stiffener combination. Instead of or in addition to using the coating die (depicted in FIG. 11, for example) to secure the fabric layer 806 to the foam profile/stiffener combination, one or more ultrasonic welds are utilized to join the various components. In the depicted embodiment, a foam profile 802 secured to a T-shaped stiffener 804 is passed between two steel wheels 808 that guide the stiffener 804 and hold the cover layer 806 in place. The wheels 808 also press against the stiffener 804 and cover layer 806. The stiffener 804 passes over one or more ultrasonic horns 810, which form the weld between the components at locations 812. Other configurations are possible, depending on which weatherstrip elements are welded, where the welds are located, etc. Accordingly, an ultrasonic welding station 800 may entirely replace the coating die station in the process line depicted in FIG. 11. Alternatively, the fabric layer may be secured utilizing continuous or intermittent mechanical fastening systems (staples, stitching, pressure rollers, etc.), thermal fusion, etc. Additional components may be utilized to create a strong bond; for example, a layer of thermally compatible material may be applied to facilitate a bond generated by thermal fusion. After securing the fabric layer with ultrasonic welding, mechanical systems, fusion, or other forms of attachment, the weatherstrip may either by finished with a complete or partial resin coating, or simply utilized without any resin coating, depending on the application. In general, if resin coating is used in addition to another form of attachment, the resin coating station could be placed downstream from the alternative attachment station, although certain types of alternative attachment (e.g., mechanical fastening) may produce a satisfactory product even if installed downstream from the resin coating station.

The invention has been described in detail in connection with the preferred embodiments. These embodiments, however, are merely for example only and the invention is not limited thereto. It will be appreciated by those skilled in the art that other variations and modifications can be easily made within the scope of the invention as defined by the appended claims.

What is claimed is:

1. A weatherstrip comprising:
   a foam profile;
   a stiffener; and
   a cover layer over the foam profile attached to at least one of the foam profile and the stiffener along longitudinal edges of the cover layer, so as to decouple at least a portion of the cover layer from the foam profile.

2. The weatherstrip of claim 1, wherein the longitudinal edges of the cover layer and a portion of at least one of the foam profile and the stiffener are coated with resin.

3. The weatherstrip of claim 2, wherein the resin overlaps the edges from about 0.03 inches to about 0.06 inches.

4. The weatherstrip of claim 2, wherein the resin comprises at least one material selected from the group consisting of thermoplastic polymer, a blend of olefinic plastic and olefinic rubber, a thermoplastic elastomeric composition, polyethylene, ethylene/methacrylic acid copolymer, ethylene/ethyl acrylate polymer, linear low density polyethylene, an ethylene interpolymer/chlorinated polyolefin blend, ionomer, polypropylene, polypropylene copolymer, nylon, polyester, thermoplastic polyurethane, latex, acrylic, polyurethane, natural rubber, and synthetic rubber.

5. The weatherstrip of claim 1, wherein the cover layer comprises a coated side and a reverse side.

6. The weatherstrip of claim 5, wherein the reverse cover layer side is disposed proximate the foam profile.

7. The weatherstrip of claim 5, wherein at least a portion of the coated cover layer side is coated with resin.

8. The weatherstrip of claim 1, wherein at least a portion of the cover layer is attached to at least a portion of the foam profile.

9. The weatherstrip of claim 8, wherein the portion of the foam profile to which the cover layer is attached is coated with resin.

10. The weatherstrip of claim 1, wherein at least a portion of the stiffener is coated with resin.

11. The weatherstrip of claim 1, wherein the cover layer comprises at least one of a woven and a non-woven fabric.

12. The weatherstrip of claim 1, wherein the cover layer comprises polypropylene.

13. The weatherstrip of claim 1, wherein the cover layer comprises a film.

14. A weatherstrip comprising:
a foam profile; and
a cover layer over the foam profile and attached to the foam profile along longitudinal edges of the cover layer, so as to decouple at least a portion of the cover layer from the foam profile.

15. A weatherstrip made according to a method comprising the steps of:
providing a foam profile;
providing a stiffener;
attaching the stiffener to the foam profile;
providing a cover layer, wherein the cover layer comprises a strip with edges;
guiding the cover layer into at least one of a desired position, orientation, and contour relative to at least one of the foam profile and the stiffener using an applicator die comprising at least one of a plate forming a shaped opening and a guide; and
passing the cover layer, the stiffener, and the foam profile through a resin coating die, wherein the edges of the strip and discrete portions of at least one of the foam profile and the stiffener are coated with resin to anchor the cover layer, while the resin is in a substantially liquid state, and wherein at least a portion of the cover layer is decoupled from the foam profile.

16. A weatherstrip made according to a method comprising the steps of:
providing a foam profile;
providing a cover layer, wherein the cover layer comprises a strip with edges;
guiding the cover layer into at least one of a desired position, orientation, and contour relative to the foam profile using an applicator die comprising at least one of a plate forming a shaped opening and a guide; and
passing the cover layer and the foam profile through a resin coating die, wherein the edges of the strip and discrete portions of the foam profile are coated with resin to anchor the cover layer, while the resin is in a substantially liquid state, and wherein at least a portion of the cover layer is decoupled from the foam profile.

* * * * *